US012594848B1

(12) United States Patent
Baird et al.

(10) Patent No.: US 12,594,848 B1
(45) Date of Patent: Apr. 7, 2026

(54) CHARGING DEVICE FOR AUTONOMOUS GROUND VEHICLE

(71) Applicant: Amazon Technologies, Inc., Seattle, WA (US)

(72) Inventors: Alan Baird, Seattle, WA (US); Oleg Kantor, Kirkland, WA (US); Alexander M. Frenkel, Seattle, WA (US); Michael Bathurst, Burien, WA (US); Timothy James Ong, Redmond, WA (US); Austin Jensen, Morgan, UT (US)

(73) Assignee: Amazon Technologies, Inc., Seattle, WA (US)

( * ) Notice: Subject to any disclaimer, the term of this patent is extended or adjusted under 35 U.S.C. 154(b) by 754 days.

(21) Appl. No.: 17/215,777

(22) Filed: Mar. 29, 2021

(51) Int. Cl.
B60L 53/30 (2019.01)
B60L 53/10 (2019.01)

(52) U.S. Cl.
CPC .............. B60L 53/30 (2019.02); B60L 53/10 (2019.02); *Y02T 90/10* (2013.01); *Y02T 90/12* (2013.01); *Y02T 90/14* (2013.01)

(58) Field of Classification Search
CPC ....... B60L 53/10; B60L 53/30; G05D 1/0011; G05D 1/021; Y02T 90/10; Y02T 90/12; Y02T 90/14
See application file for complete search history.

(56) References Cited

U.S. PATENT DOCUMENTS 4,588,938 A     5/1986  Liautaud et al.
5,346,406 A *   9/1994  Hoffman .............. B60L 3/0069
                                                  439/924.1

8,324,585 B2    12/2012 McBroom et al.
9,010,348 B1 *  4/2015  Kite ......................... E04H 6/04
                                                  135/88.06
9,559,461 B1    1/2017  Diehr
10,399,443 B2   9/2019  Kwa et al.
10,644,519 B2   5/2020  Brady et al.
        (Continued)

FOREIGN PATENT DOCUMENTS

CN     106985695 A    7/2017
CN     210156947 U    3/2020
        (Continued)

*Primary Examiner* — Taelor Kim
*Assistant Examiner* — Johali A Torres Ruiz
(74) *Attorney, Agent, or Firm* — Knobbe, Martens, Olson & Bear, LLP

(57)                 ABSTRACT

Aspects described herein include an apparatus for charging an autonomous ground vehicle (AGV). The apparatus includes a plurality of first electrical contacts coupled to a power supply and that project upwardly from a base, and a plurality of receiver sections dimensioned to retain portions of a plurality of axially-aligned wheels of the AGV. The first electrical contacts are arranged relative to the plurality of receiver sections such that when the axially-aligned wheels roll into the plurality of receiver sections, second electrical contacts of the AGV are contacted to the first electrical contacts. After a plurality of the second electrical contacts are contacted with power contacts of the first electrical contacts, at least one other of the second electrical contacts is contacted with a control contact of the first electrical contacts to enable power delivery to the AGV through the power contacts.

15 Claims, 18 Drawing Sheets

(56)　　　　　　　References Cited

U.S. PATENT DOCUMENTS

| | | | |
|---|---|---|---|
| 11,135,930 | B2 | 10/2021 | Traverso et al. |
| 11,171,448 | B2 | 11/2021 | Hirose et al. |
| 11,552,488 | B2 | 1/2023 | Daily et al. |
| 11,623,539 | B1 | 4/2023 | Brady |
| 2004/0158357 | A1 | 8/2004 | Lee et al. |
| 2017/0282734 | A1* | 10/2017 | Noorani ................. B64U 80/25 |
| 2018/0208126 | A1* | 7/2018 | Arvidsson ................. B60R 9/10 |
| 2018/0222741 | A1* | 8/2018 | Cox ........................ B67D 7/065 |
| 2019/0059680 | A1 | 2/2019 | Fox et al. |
| 2019/0202064 | A1* | 7/2019 | Wolff ................... G05D 1/0225 |
| 2019/0346852 | A1* | 11/2019 | Itozawa ............. G05B 19/4155 |
| 2019/0380552 | A1 | 12/2019 | Han et al. |
| 2020/0249688 | A1* | 8/2020 | Caussy ............... H02J 7/00034 |
| 2020/0269712 | A1* | 8/2020 | Kozlovsky .............. H02J 50/10 |
| 2020/0375093 | A1* | 12/2020 | Matus ................... B60W 30/10 |
| 2021/0083494 | A1* | 3/2021 | Towner ................... B60L 53/35 |
| 2021/0228039 | A1 | 7/2021 | Brouwers et al. |
| 2022/0194245 | A1* | 6/2022 | Gonano ................... B60L 53/37 |
| 2022/0219557 | A1* | 7/2022 | Poluboiarinov ...... H02J 7/0049 |

FOREIGN PATENT DOCUMENTS

| | | |
|---|---|---|
| CN | 111231723 A | 6/2020 |
| CN | 115101994 A | 9/2022 |

* cited by examiner

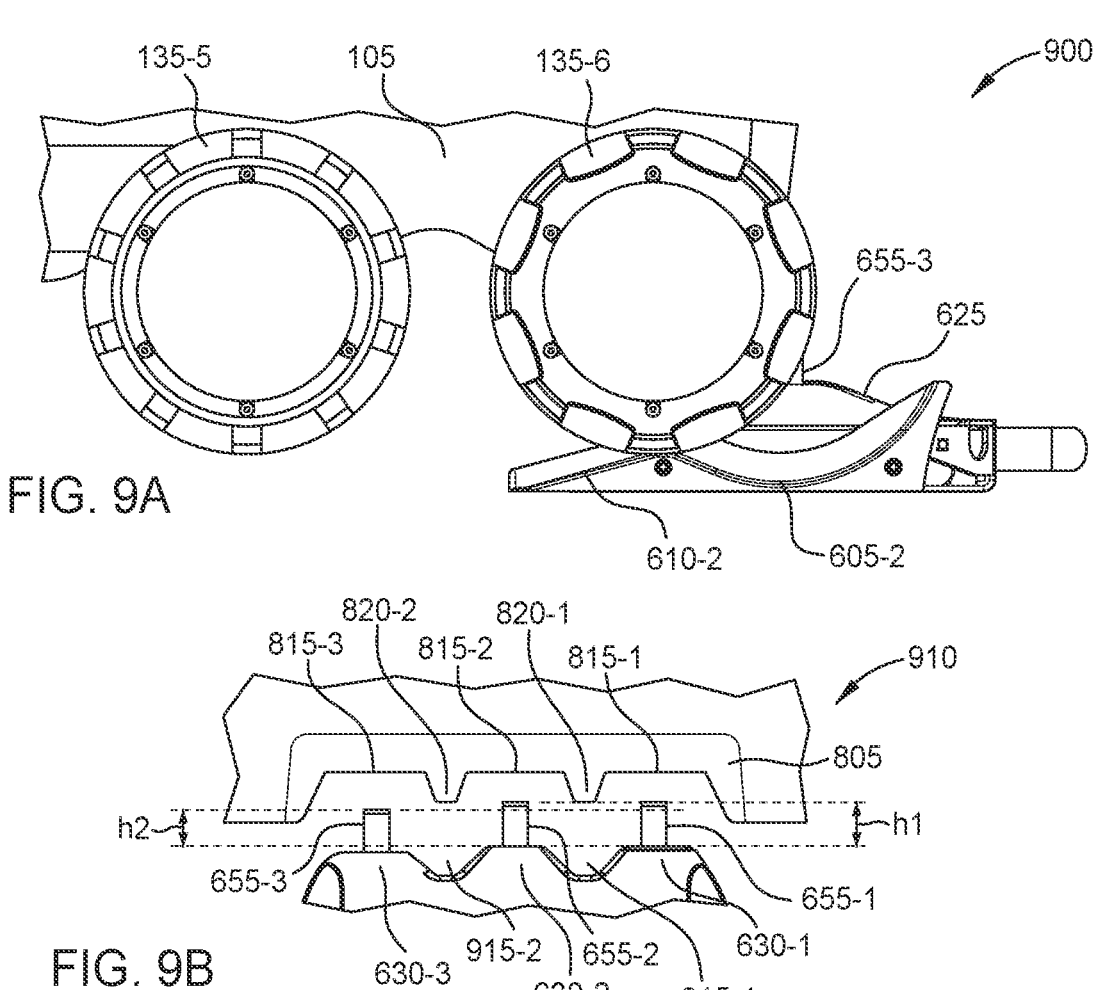
FIG. 9A
FIG. 9B
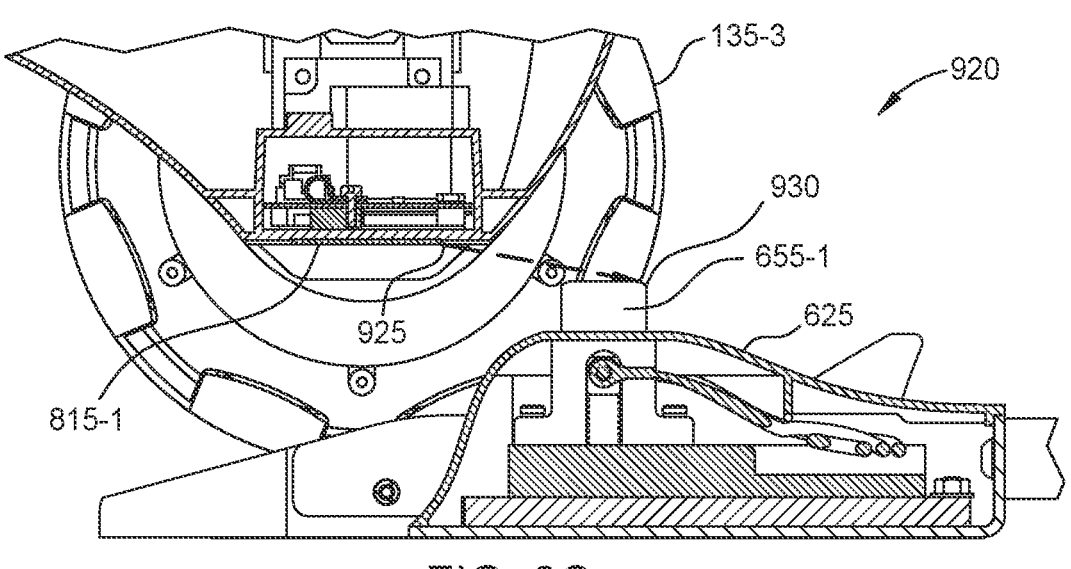
FIG. 9C

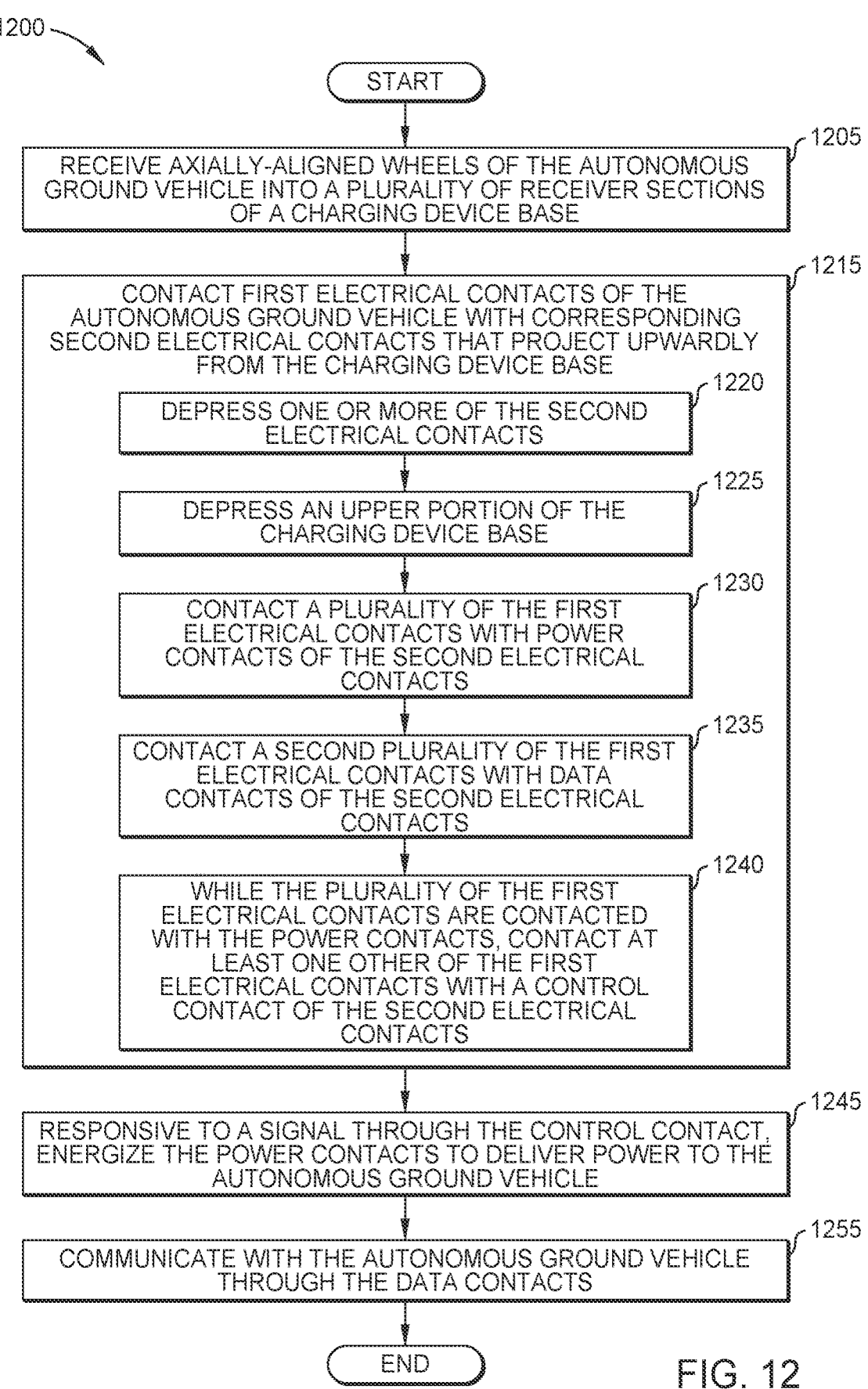

1200

START

RECEIVE AXIALLY-ALIGNED WHEELS OF THE AUTONOMOUS
GROUND VEHICLE INTO A PLURALITY OF RECEIVER SECTIONS
OF A CHARGING DEVICE BASE — 1205

CONTACT FIRST ELECTRICAL CONTACTS OF THE
AUTONOMOUS GROUND VEHICLE WITH CORRESPONDING
SECOND ELECTRICAL CONTACTS THAT PROJECT UPWARDLY
FROM THE CHARGING DEVICE BASE — 1215

DEPRESS ONE OR MORE OF THE SECOND
ELECTRICAL CONTACTS — 1220

DEPRESS AN UPPER PORTION OF THE
CHARGING DEVICE BASE — 1225

CONTACT A PLURALITY OF THE FIRST
ELECTRICAL CONTACTS WITH POWER
CONTACTS OF THE SECOND ELECTRICAL
CONTACTS — 1230

CONTACT A SECOND PLURALITY OF THE FIRST
ELECTRICAL CONTACTS WITH DATA
CONTACTS OF THE SECOND ELECTRICAL
CONTACTS — 1235

WHILE THE PLURALITY OF THE FIRST
ELECTRICAL CONTACTS ARE CONTACTED
WITH THE POWER CONTACTS, CONTACT AT
LEAST ONE OTHER OF THE FIRST
ELECTRICAL CONTACTS WITH A CONTROL
CONTACT OF THE SECOND ELECTRICAL
CONTACTS — 1240

RESPONSIVE TO A SIGNAL THROUGH THE CONTROL CONTACT,
ENERGIZE THE POWER CONTACTS TO DELIVER POWER TO THE
AUTONOMOUS GROUND VEHICLE — 1245

COMMUNICATE WITH THE AUTONOMOUS GROUND VEHICLE
THROUGH THE DATA CONTACTS — 1255

END

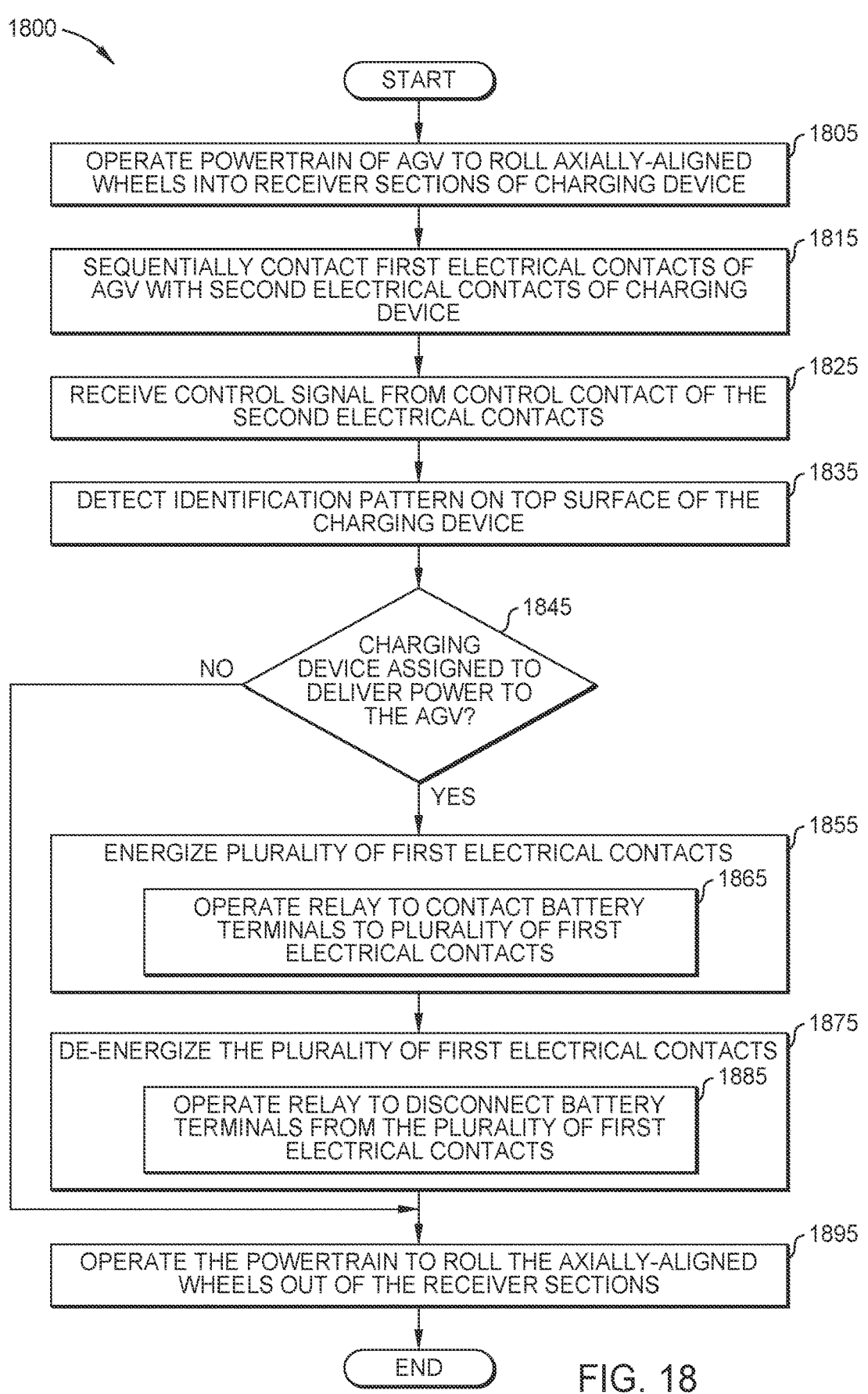

START

OPERATE POWERTRAIN OF AGV TO ROLL AXIALLY-ALIGNED WHEELS INTO RECEIVER SECTIONS OF CHARGING DEVICE — 1805

SEQUENTIALLY CONTACT FIRST ELECTRICAL CONTACTS OF AGV WITH SECOND ELECTRICAL CONTACTS OF CHARGING DEVICE — 1815

RECEIVE CONTROL SIGNAL FROM CONTROL CONTACT OF THE SECOND ELECTRICAL CONTACTS — 1825

DETECT IDENTIFICATION PATTERN ON TOP SURFACE OF THE CHARGING DEVICE — 1835

CHARGING DEVICE ASSIGNED TO DELIVER POWER TO THE AGV? — 1845

NO

YES

ENERGIZE PLURALITY OF FIRST ELECTRICAL CONTACTS — 1855

OPERATE RELAY TO CONTACT BATTERY TERMINALS TO PLURALITY OF FIRST ELECTRICAL CONTACTS — 1865

DE-ENERGIZE THE PLURALITY OF FIRST ELECTRICAL CONTACTS — 1875

OPERATE RELAY TO DISCONNECT BATTERY TERMINALS FROM THE PLURALITY OF FIRST ELECTRICAL CONTACTS — 1885

OPERATE THE POWERTRAIN TO ROLL THE AXIALLY-ALIGNED WHEELS OUT OF THE RECEIVER SECTIONS — 1895

END          FIG. 18

CHARGING DEVICE FOR AUTONOMOUS GROUND VEHICLE

BACKGROUND

The present disclosure relates to autonomous ground vehicles, and more specifically, to implementations of charging devices for autonomous ground vehicles.

Autonomous ground devices (AGVs) are becoming increasingly prevalent, and used for various applications within residential, commercial, and industrial environments. To reduce the downtime of the autonomous ground devices during deployment, charging devices may also be deployed within or near the environments. The charging devices may be designed to reliably contact the autonomous ground vehicles despite component wear. Additionally, the charging devices may be designed to ensure the safety of individuals operating in proximity with the autonomous ground devices within the environment.

BRIEF DESCRIPTION OF DRAWINGS

FIG. 9A is a side view of an autonomous ground vehicle having axially-aligned wheels rolling toward arcuate detents of the charging device, according to one or more embodiments.

FIG. 9B is a rear view of the autonomous ground vehicle illustrating electrical contacts of the charging interface and the charging device, according to one or more embodiments.

FIG. 9C is a cross-sectional view of the autonomous ground vehicle illustrating electrical contacts of the charging interface and the charging device, according to one or more embodiments.

FIG. 12 is a method of charging an autonomous ground vehicle, according to one or more embodiments.

FIG. 18 is a method of operating an autonomous ground vehicle, according to one or more embodiments.

DETAILED DESCRIPTION

Figure 1:
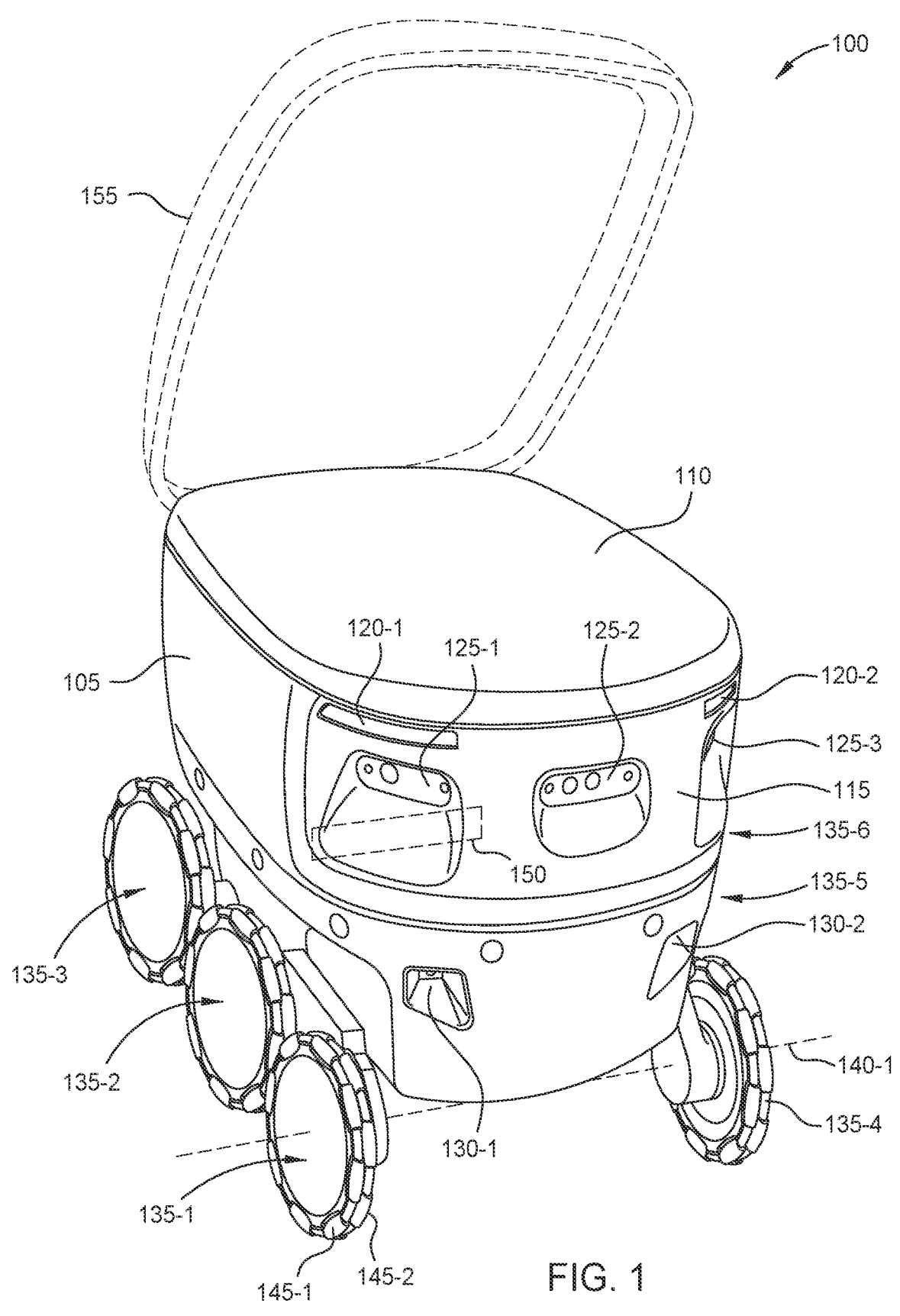
FIG. 1 illustrates an autonomous ground vehicle, according to one or more embodiments.

The disclosure is generally directed to techniques for reliably and safely charging autonomous ground vehicles. In some embodiments, an apparatus (e.g., a charging device) comprises a base, a power supply, and a plurality of first electrical contacts coupled to the power supply and that project upwardly from the base. The first electrical contacts comprise a plurality of power contacts and one or more control contacts. The apparatus further comprises a plurality of receiver sections dimensioned to retain portions of a plurality of axially-aligned wheels of the autonomous ground vehicle. The first electrical contacts are arranged relative to the plurality of receiver sections such that when the axially-aligned wheels roll into the plurality of receiver sections, second electrical contacts of the autonomous ground vehicle are contacted to the first electrical contacts. After a plurality of the second electrical contacts are contacted with the power contacts, at least one other of the second electrical contacts is contacted with the control contact to enable power delivery to the autonomous ground vehicle through the power contacts.

Beneficially, by contacting the power contacts before contacting the control contact, the galvanic connection may be established with the power contacts before applying voltage across the power contacts. In this way, arcing with the power contacts may be avoided when contacting with the second electrical contacts of the autonomous ground vehicle. Arcing tends to oxidize the power contacts and will increase the resistance of the power contacts over time. Further, when disconnecting the second electrical contacts, the control contact may be disconnected first, thus removing the voltage from across the power contacts, before the power contacts are disconnected.

In some embodiments, the apparatus further comprises one or more computer processors configured to transmit a control signal through the control contact to the AGV. The control signal operates a relay of the AGV to contact one or more battery terminals to the plurality of the second electrical contacts. The one or more computer processors are further configured to measure a voltage between the plurality of the second contacts, and enable the power delivery to the AGV responsive to the measured voltage.

In some embodiments, the plurality of receiver sections comprise a plurality of arcuate detents, and may further comprise a plurality of ramps having inclined ends arranged adjacent to the plurality of arcuate detents. In some embodiments, each receiver section comprises laterally-extending posts that are spaced apart from each other in a direction of rolling of the autonomous ground vehicle.

In some embodiments, the control contact is offset from the power contacts in the direction of rolling of the autonomous ground vehicle. In some embodiments, the power contacts are elastically-biased electrical contacts that project to a first height, and the control contact projects to a second height less than the first height. The control contact may also be an elastically-biased electrical contact.

In some embodiments, the base is a multi-portion base in which an upper portion of the base is compliantly connected with a lower portion of the base. In these embodiments, lowering the second electrical contacts into contact with the first electrical contacts causes the upper portion to be depressed.

Beneficially, the travel of the power contacts and/or the control contact, enabled by the elastic biasing and/or the compliant upper portion of the base, accommodates the wear of components of the apparatus and/or the autonomous ground vehicle. For example, the power contacts and/or the control contact of the apparatus may wear over time, as well as the wheels and/or second electrical contacts of the autonomous ground vehicle.

FIG. 1 illustrates an autonomous ground vehicle (AGV) 100, according to one or more embodiments. More specifically, FIG. 1 provides a view of a forward end of the AGV 100. The AGV 100 may be implemented in any suitable form to perform one or more operations. As shown, the AGV 100 may be configured to transport items for residential deliveries. Other non-limiting examples of the AGV 100 includes mobile drive units for transporting items within an industrial environment, automated conveyances, consumer devices such as robotic vacuums, and so forth.

The AGV 100 comprises a body 105 operatively connected with a lid 110. The body 105 and the lid 110 may be formed of any suitable material(s). For example, the body 105 and the lid 110 may be formed of a thermoplastic polymer (e.g., nylon) that is both durable and light weight. The body 105 and the lid 110 may be connected in any suitable manner, such as through a hinge permitting the lid 110 to be pivoted into an open position 155.

In some cases, the body 105 and the lid 110 form a waterproof or other protective enclosure when the lid 110 is in a closed position. In some embodiments, the body 105 defines a main compartment (not shown) for inserting, storing, and/or removing items such as parcels. The body 105 may define additional compartments for storing and/or arranging a power storage device (e.g., battery), a powertrain (e.g., electric motor(s) and drivetrain components), control hardware (e.g., computer processor(s), sensors), as well as various other components.

A forward panel 115 is defined on the body 105 that includes sensors and other components. As shown, the forward panel 115 comprises indicator lights 120-1, 120-2 arranged in lateral positions, sensors 125-1, 125-3 arranged in lateral positions, and a sensor 125-2 arranged in a central position. In some embodiments, the sensors 125-1, 125-2, 125-3 are configured to perform obstacle detection. The sensors 125-1, 125-2, 125-3 may have any suitable implementation, such as visual sensors (e.g., cameras), ranging sensors (e.g., radar, lidar), proximity sensors, and so forth. In some embodiments, each of the sensors 125-1, 125-2, 125-3 comprise stereo cameras. Other types of sensors may be included in the AGV 100, such as inertial sensors, navigational sensors, and so forth.

The body 105 further comprises sensors 130-1, 130-2 arranged in lateral positions on a forward end of the body 105. In some embodiments, the sensors 130-1, 130-2 are configured to perform obstacle detections. The sensors 130-1, 130-2 may have any suitable implementation. In some embodiments, the sensors 130-1, 130-2 comprise time-of-flight sensors (e.g., point lidar) that detect obstacles in the path of the AGV 100, such as curbs and cliffs.

In some embodiments, the sensors 125-1, 125-2, 125-3 communicate sensor signals to one or more computer processors of the AGV 100, which operates a plurality of wheels 135-1, 135-2, . . . , 135-6 to maneuver the AGV 100 within the environment (e.g., to steer around a detected obstacle). In some embodiments, the wheels 135-1, 135-2, . . . , 135-6 are arranged in three (3) pairs of axially-aligned wheels: the wheels 135-1, 135-4 are arranged as a forward pair aligned along a first axis 140-1, the wheels 135-2, 135-5 are arranged as a central pair aligned along a second axis, and the wheels 135-3, 135-6 are arranged as an aft pair aligned along a third axis. The axially-aligned wheels of a pair may, but need not be, connected to an axle. As shown, the axially-aligned wheels of each pair are independent of each other. Further, the wheels of a pair may be considered to be axially-aligned despite the temporary displacement of one wheel relative to the other, e.g., a bump or a dip encountered by the wheel.

In some embodiments, the AGV 100 uses differential steering to turn the AGV 100 without turning pairs of the wheels 135-1, 135-2, . . . , 135-6. For example, the AGV 100 may be able to perform neutral turns by rotating, within a pair, one wheel in a forward direction and the other wheel in a reverse direction.

In some embodiments, each of the wheels 135-1, 135-2, . . . , 135-6 comprises multiple treads 145-1, 145-2 extending around a circumference of the respective wheel. In some embodiments, each of the treads 145-1, 145-2 includes a ring disposed around the circumference of the wheel, and a plurality of rollers that are arranged around the ring and spaced apart from each other.

As the AGV 100 travels along a surface, the rollers contact the surface as the wheels 135-1, 135-2, . . . , 135-6 rotate. When contacting the surface, the rotation of the roller tends to allow the AGV 100 to pivot or turn more easily. In some cases, the rollers are raised sections of the treads 145-1, 145-2 that contact the surface, and are separated by lowered sections that do not contact the surface. In some embodiments, the lowered sections are attached to a central structure of the wheels 135-1, 135-2, . . . , 135-6. In some cases, the roller pattern of one tread 145-1 are offset from the roller pattern of the other tread 145-2.

The AGV 100 further comprises a charging interface 150 near an aft end of the AGV 100. The charging interface 150 comprises a plurality of electrical contacts that are communicatively coupled with a power source of the AGV 100. In some embodiments, the plurality of electrical contacts may also be communicatively coupled with one or more computer processor(s) of the AGV 100 to communicate control signals, data, and so forth. In some embodiments, the plurality of electrical contacts of the AGV 100 are lowered onto electrical contacts of a charging device to initiate charging.

In some embodiments, the charging interface 150 is accessible along a bottom surface of the body 105. In some embodiments, the AGV 100 may drive in a forward direction over the charging device to couple the electrical contacts of the AGV 100 with the charging device. In some embodiments, the AGV 100 drives in a reverse direction over the charging device to couple the electrical contacts of the AGV 100 with the charging device.

Figure 2:
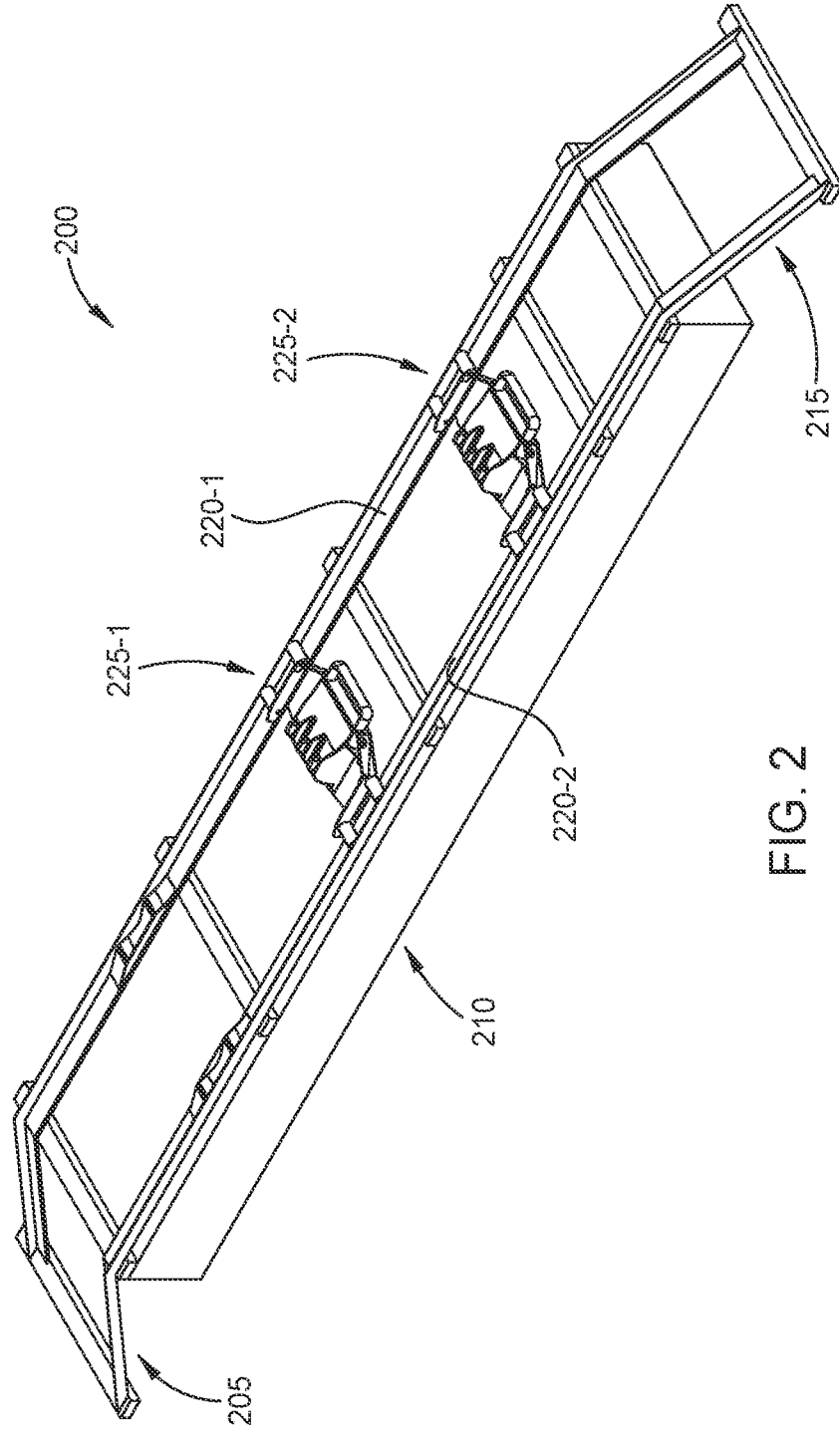
FIG. 2 illustrates a rail-based system for charging multiple autonomous ground vehicles, according to one or more embodiments.

FIG. 2 illustrates a rail-based system 200 for charging multiple autonomous ground vehicles, according to one or more embodiments. The system 200 may be used in conjunction with other embodiments, e.g., to arrange multiple charging devices 225-1, 225-2 to charge multiple instances of the AGV 100 of FIG. 1.

The system 200 comprises an elevated section 210 that is arranged between ramp sections 205, 215. The ramp sections 205, 215 and/or the elevated section 210 are disposed above a reference surface, such as a floor in an environment. The elevated section 210 may have an elevation selected to accommodate a height of the charging devices. For example, some implementations of the charging devices may extend partly beneath the elevated section 210. The ramp sections 205, 215 may operate as entrances and/or exits to the elevated section 210. In this way, the system 200 may support AGVs traveling in one or both directions across the system 200. In alternate embodiments, one or more of the ramp sections 205, 215 may be omitted.

The system 200 comprises a plurality of rails 220-1, 220-2 that are spaced apart from each other. The rails 220-1, 220-2 provide rolling surfaces for the wheels (e.g., axially-aligned wheels) of the autonomous ground vehicle. In some embodiments, the rails 220-1, 220-2 include vertical projections from the rolling surfaces that limit lateral motion of the wheels of the AGV while contacting the rolling surfaces.

In some embodiments, the system 200 defines one or more openings between the rails 220-1, 220-2 and one or more supports extending between the rails 220-1, 220-2. As discussed above, some implementations of the charging devices may extend partly beneath the elevated section 210 by extending through one of the openings. In other embodiments, a surface may extend between the rails 220-1, 220-2. For example, the rails 220-1, 220-2 may be integrally formed with the surface. Further, although the system 200 is depicted as being disposed above a reference surface, alternate implementations of the implementations may be integrated into the reference surface. For example, the rails 220-1, 220-2 may be formed into the surface.

As shown, the plurality of rails 220-1, 220-2 extend through the ramp sections 205, 215 and the elongated section 210. In other embodiments, the rails 220-1, 220-2 extend only through the elongated section 210. For example, the ramp sections 205, 215 may include continuous surfaces, input guide sections as in FIG. 4 below, and so forth.

The system 200 further comprises one or more charging devices 225-1, 225-2 that are arranged between the rails 220-1, 220-2. In some embodiments, the charging devices 225-1, 225-2 are rigidly attached to (or integrated into) the rail-based system 200. In other embodiments, the charging devices 225-1, 225-2 may be removable and/or portable. In one example, portions of the charging devices 225-1, 225-2 may be attached to the rails 220-1, 220-2 using screws or other fasteners. In another example, portions of the charging devices 225-1, 225-2 may rest atop the rails 220-1, 220-2 without attachment. In another example, complementary features of the charging devices 225-1, 225-2 and the rails 220-1, 220-2 may be mated to position the charging devices 225-1, 225-2 between the rails 220-1, 220-2. In alternate implementations, the charging devices 225-1, 225-2 may be attached to another surface providing suitable arrangement relative to the rails 220-1, 220-2.

The system 200 further comprises receiver sections arranged relative to the rails 220-1, 220-2. Each receiver section is dimensioned to retain portions of a respective wheel of the axially-aligned wheels. As described herein, "retaining" a wheel indicates that a torque greater than a non-zero, minimum threshold torque must be applied to the wheel to cause the wheel to exit (e.g., roll out of) the receiver section. Stated another way, the minimum threshold torque must exceed the torque required to begin rolling the wheel along a flat surface. The receiver sections may be integrated or attached to the rails 220-1, 220-2, or may be included in the charging devices 225-1, 225-2. In some embodiments, the receiver sections are disposed on respective rails 220-1, 220-2.

The charging devices 225-1, 225-2 comprise a plurality of first electrical contacts projecting upwardly. The first electrical contacts are arranged relative to the receiver sections such that, when the axially-aligned wheels roll into the receiver sections, second electrical contacts of the autonomous ground vehicle are lowered into contact with the first electrical contacts. As will be discussed in greater detail below, the second electrical contacts are contacted in a sequential order. In some embodiments, after a plurality of the second electrical contacts are contacted with power contacts of the first electrical contacts, at least one other of the second electrical contacts is contacted with a control contact of the first electrical contacts to enable power delivery to the autonomous ground vehicle through the power contacts. In some embodiments, the first electrical contacts further comprises data contacts, which may be contacted to corresponding ones of the second electrical contacts within the sequential order. For example, the data contacts may be contacted before contacting the control contact.

Figure 3:
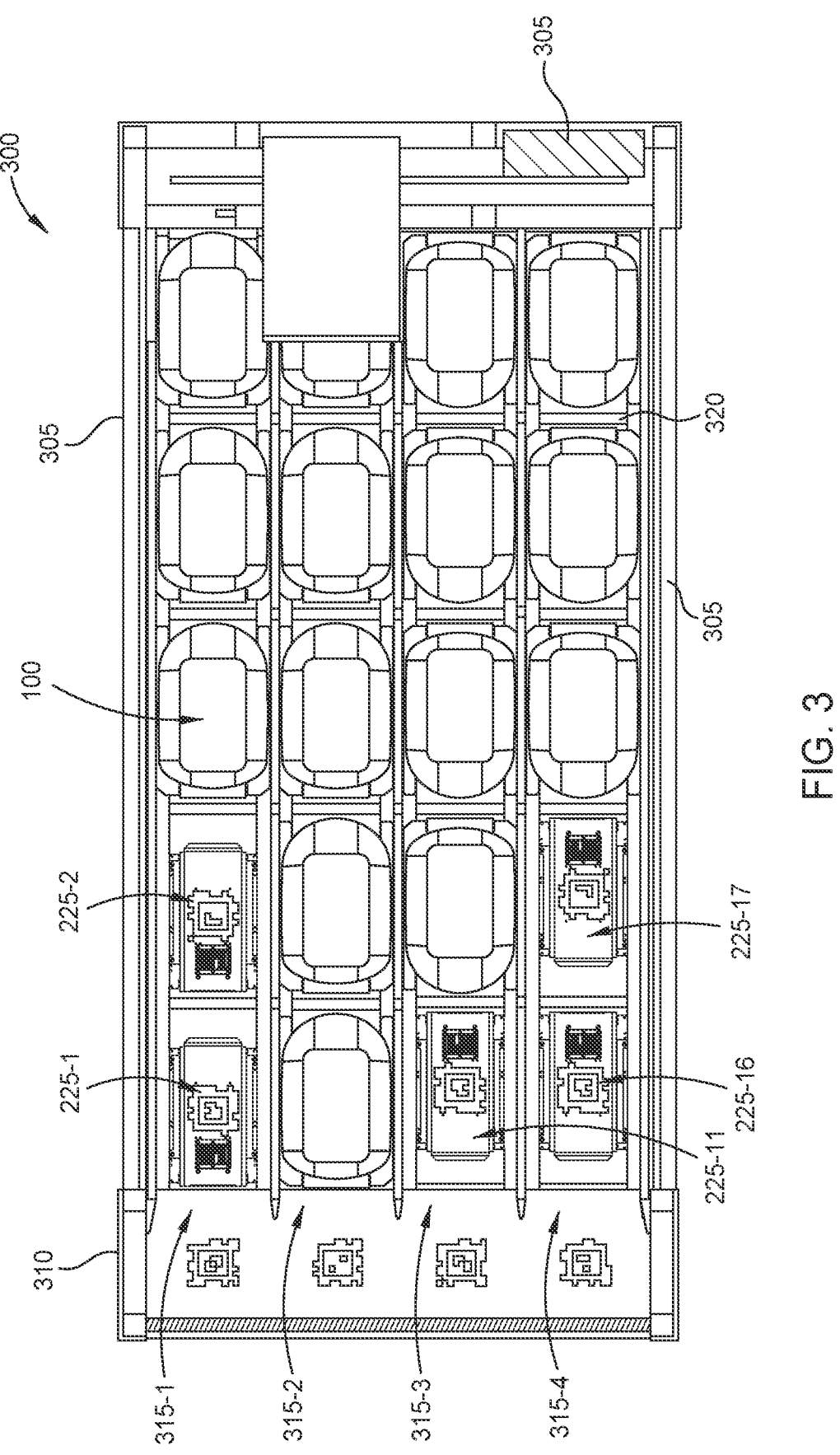
FIG. 3 illustrates a container for storing and charging multiple autonomous ground vehicles, according to one or more embodiments.

FIG. 3 illustrates an enclosure 300 for storing and charging multiple autonomous ground vehicles, according to one or more embodiments. The enclosure 300 may be used in conjunction with other embodiments. For example, the enclosure 300 may include multiple instances of the rail-based system 200 of FIG. 2 to charge multiple AGVs.

The enclosure 300 may be implemented in any suitable form, whether static or portable. For example, the enclosure 300 may be implemented as a room within a building, a trailer capable of being towed by a powered vehicle (such as an automobile), and so forth. The enclosure 300 comprises a plurality of exterior walls 305 and a ramp section 310 that collectively define an interior volume 320 of the enclosure 300. The ramp section 310 may be attached to the exterior walls 305 using any suitable techniques, such as a hinged interface. Further, although a single ramp section 310 is shown, alternate implementations of the enclosure 300 may include additional ramp sections.

A plurality of lanes 315-1, 315-2, 315-3, 315-4 are defined within the interior volume 320. In some embodiments, each of the lanes 315-1, 315-2, 315-3, 315-4 may include a respective rail-based system 200 of FIG. 2. In some cases, each of the lanes 315-1, 315-2, 315-3, 315-4 includes a distinct pair of rails. In other cases, adjacent lanes of the lanes 315-1, 315-2, 315-3, 315-4 may include shared rails.

Each of the lanes 315-1, 315-2, 315-3, 315-4 comprises a plurality of charging devices 225-1, 225-2, . . . , 225-11, . . . 225-16, 225-17, . . . . As shown, the enclosure has a 4×5 configuration where each of the four (4) lanes 315-1, 315-2, 315-3, 315-4 includes a respective five (5) charging devices.

Each of the lanes 315-1, 315-2, 315-3, 315-4 may be assigned a directionality, such that all of the AGVs in a particular lane 315-1, 315-2, 315-3, 315-4 may have a same orientation to couple with respective charging devices. As shown, AGVs may enter the lanes 315-1, 315-2 by driving up the ramp section 310 in a forward direction, and AGVs may enter the lanes 315-3, 315-4 by driving up the ramp section 310 in a reverse direction.

Figure 4:
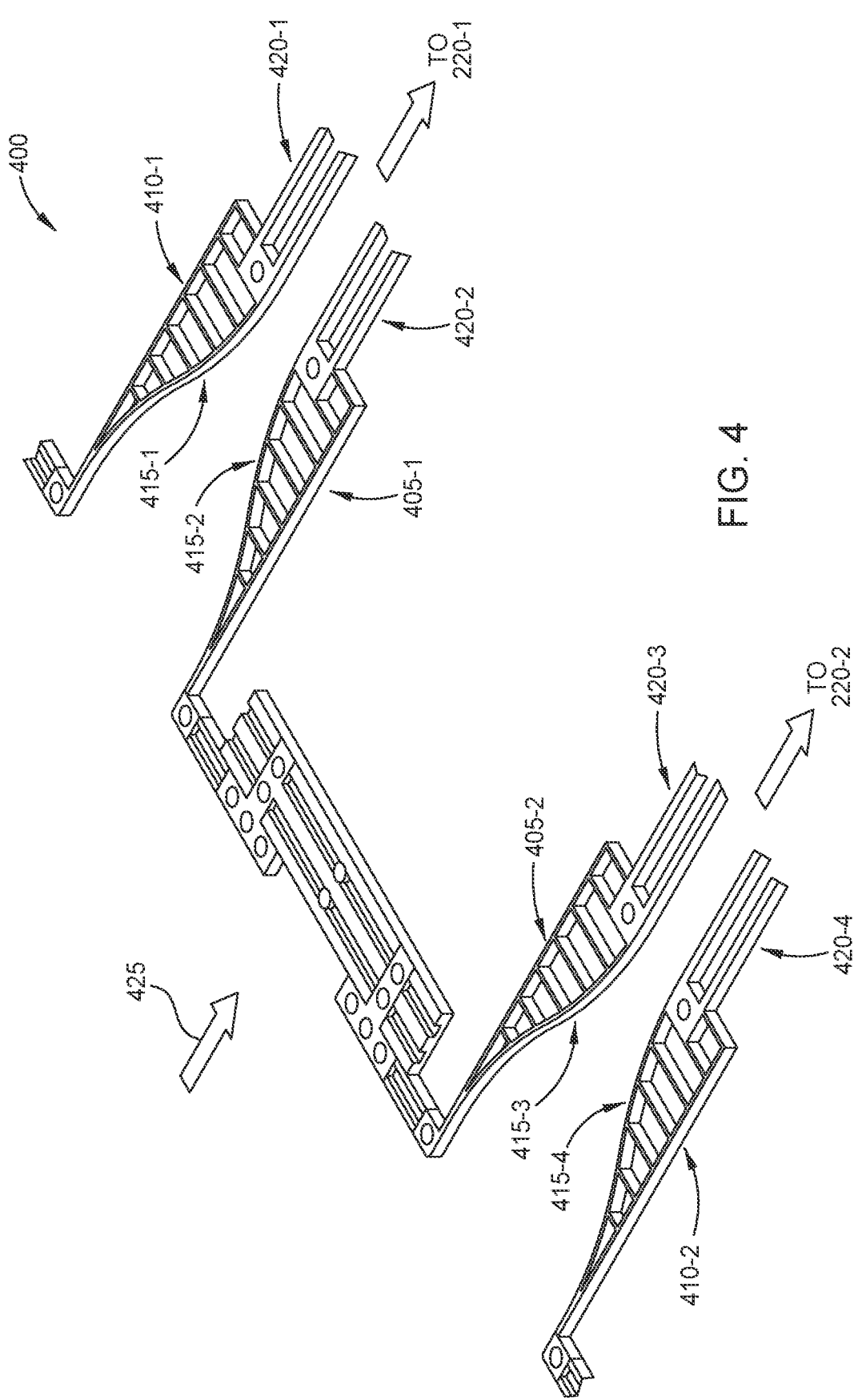
FIG. 4 illustrates an input guide section for the rail-based system, according to one or more embodiments.

FIG. 4 illustrates an input guide section 400 for the rail-based system, according to one or more embodiments. The input guide section 400 may be used in conjunction with other embodiments, such as the rail-based system 200 of FIG. 2.

The input guide section 400 comprises inner guides 405-1, 405-2 that are spaced apart from each other, and outer guides 410-1, 410-2 that are spaced apart from each other. The outer guide 410-1 comprises a curved taper 415-1 opposing a curved taper 415-2 of the inner guide 405-1, and the inner guide 405-2 comprises a curved taper 415-3 opposing a curved taper 415-4 of the outer guide 410-2.

Thus, the curved tapers 415-1, 415-2 and the curved tapers 415-3, 415-4 define respective entrances to the input guide section 400 along a direction 425 of motion of the AGV. The input guide section 400 further comprises a rail section 420-1 that connects to an exit end of the outer guide 410-1, a rail section 420-2 that connects to an exit end of the inner guide 405-1, a rail section 420-3 that connects to an exit end of the inner guide 405-2, and a rail section 420-4 that connects to an exit end of the outer guide 410-2. The width between the curved tapers 415-1, 415-2 and the entrance and the curved tapers 415-3, 415-4 at the respective entrances is greater than the widths at the exit ends. As shown, the rail sections 420-1, 420-2, 420-3, 420-4 extend substantially parallel to each other. The rail sections 420-2, 420-3 may limit a lateral motion of inner edges of the wheels of the AGV, and the rail sections 420-1, 420-4 may limit lateral motion of outer edges of the wheels of the AGV.

Thus, the inner guide 405-1 and the outer guide 410-1 are configured to direct a first wheel of the AGV toward the rail 220-1, and the inner guide 405-2 and the outer guide 410-2 are configured to direct a second, axially-aligned wheel of the AGV toward the rail 220-2. Should an AGV approach the input guide section 400 at an oblique angle (e.g., off-axis), one or both axially-aligned wheels will contact a respective curved taper 415-1, 415-2, 415-3, 415-4. Due to the decreasing width between the curved tapers 415-1, 415-2 and the curved tapers 415-3, 415-4, the continued rolling of the wheels after contact urges the wheels into an alignment for entering the rails 220-1, 220-2 (e.g., toward an axis aligned with the rails 220-1, 220-2). In some embodiments, rollers of the wheels (as shown in FIG. 1) may ease the realignment of the wheels.

In some embodiments, the rail 220-1 comprises one or both of the rail sections 420-1, 420-2, and the rail 220-2 comprises one or both of the rail section 420-3, 420-4. In other embodiments, the rails 220-1, 220-2 are distinct from the rail sections 420-1, 420-2, 420-3, 420-4.

Figure 5:
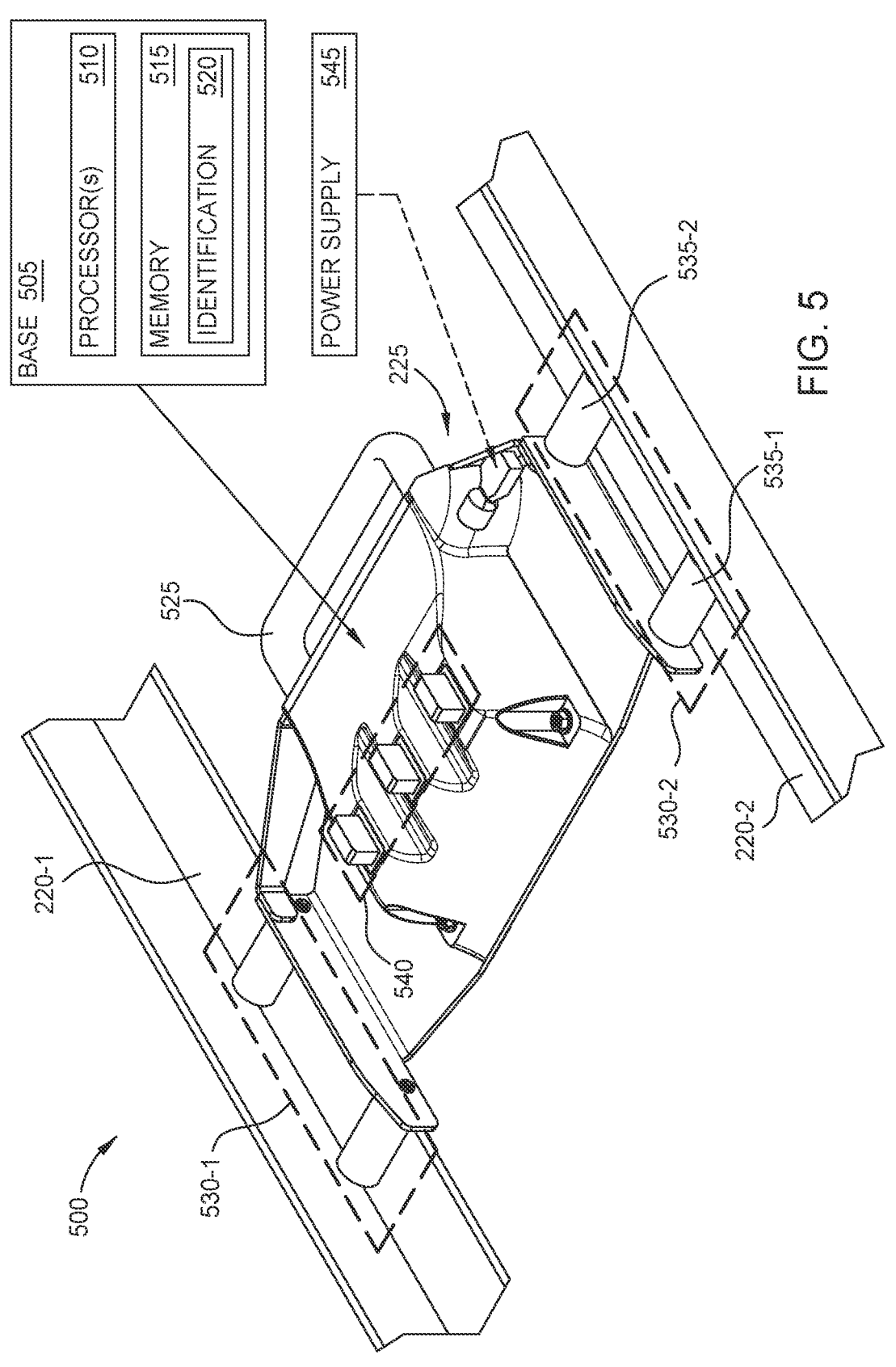
FIG. 5 illustrates a rail-mounted charging device for charging an autonomous ground vehicle, according to one or more embodiments.

FIG. 5 illustrates a rail-mounted charging device 225 for charging an autonomous ground vehicle, according to one or more embodiments. The charging device 225 may be used in conjunction with other embodiments. For example, the charging devices 225-1, 225-2 of FIG. 2 may represent instances of the charging device 225.

In diagram 500, the charging device 225 comprises a base 505 connected to a handle 525 and to receiver sections 530-1, 530-2. The base 505 may comprise one or more components formed of any suitable material(s), such as a thermoplastic polymer housing attached to a metal baseplate. The receiver sections 530-1, 530-2 may be formed of any suitable material(s), such as a thermoplastic polymer or metal. Each of the receiver sections 530-1, 530-2 comprises laterally-extending posts 535-1, 535-2 that are spaced apart from each other in a direction of rolling of the autonomous ground vehicle. As shown, the laterally-extending posts 535-1, 535-2 are connected to lateral edges of the base 505 using screws, and rest on the respective rails 220-1, 220-2.

A plurality of electrical contacts 540 project upwardly from the base 505. In some embodiments, the electrical contacts 540 project upwardly through openings formed in ridges of the base 505. The electrical contacts 540 comprise a plurality of power contacts and one or more control contacts. In some embodiments, some or all of the electrical contacts 540 are elastically-biased electrical contacts, and capable of reliably forming contact with electrical contacts of the AGV despite misalignment, wear of components, and so forth.

The size of the posts 535-1, 535-2 and the spacing are selected to receive and retain a wheel of the AGV (e.g., based on a radius of the wheel). When the wheels are retained by the receiver sections 530-1, 530-2, the AGV is positioned such that its electrical contacts contact the electrical contacts 540 of the charging device 225. For example, the height of the posts 535-1, 535-2 and the spacing may be selected such that the wheel contacts the posts 535-1, 535-2 and the rail 220-1, 220-2 when retained by the receiver section 530-1, 530-2. In another example, the height of the posts 535-1, 535-2 and the spacing may be selected such the wheel is elevated above the rail 220-1, 220-2 when retained by the receiver section 530-1, 530-2.

The power contacts and, optionally the control contact, of the electrical contacts 540 are coupled with a power supply 545. The power supply 545 may be implemented in any suitable form, such as one or more power sources and power conditioning hardware. In some embodiments, the power supply 545 receives alternating current (AC) power, such as wall power, and performs power conditioning to supply direct current (DC) power to the power contacts of the electrical contacts. The power supply 545 is shown as being external to the base 505 but alternate implementations may include some or all of the components of the power supply 545 within the base 505.

In some embodiments, the base 505 houses one or more computer processors 510 (also referred to as processors 510) and a memory 515. The one or more computer processors 510 may be implemented in any suitable form, such as a general purpose microprocessor, a controller, an application-specific integrated circuit (ASIC), and so forth. The memory 515 may include a variety of computer-readable media selected for their size, relative performance, or other capabilities: volatile and/or non-volatile media, removable and/or non-removable media, etc.

In some embodiments, the one or more processors 510 are communicatively connected with one or more networks of any suitable types, such as the Internet, a local area network (LAN), a wide area network (WAN), and/or a wireless network. The communicative connections to the network may have any suitable implementation, such as copper transmission cable(s), optical transmission fiber(s), wireless transmission, router(s), firewall(s), switch(es), gateway computer(s), and/or edge server(s).

The memory 515 may include one or more modules for performing various functions described herein. In one embodiment, each module includes program code that is executable by the one or more processors 510. In another embodiment, each module is partially or fully implemented in hardware (i.e., circuitry) or firmware of the charging device 225 (e.g., as circuitry within the one or more processors 510). However, other embodiments of the diagram 500 may include modules that are partially or fully implemented in other hardware or firmware, such as hardware or firmware included in one or more other computing devices connected with the network, and so forth. Stated another way, the overall functionality of the one or more modules may be distributed among other devices.

In some embodiments, the one or more processors 510 control a connection of the power supply 545 to the power contacts of the electrical contacts 540, and thus may control the charging of the AGV when coupled to the electrical contacts 540. For example, when the AGV is coupled to the electrical contacts 540, one or more computer processors of the AGV may communicate signals with the one or more processors 510 via the control the connections of the electrical contacts 540 and/or electrical contacts of the AGV.

The signals transmitted via the control contact (or other electrical contacts 540) may include any suitable information. In some embodiments, a first signal may be an enable signal received by the one or more processors 510 that configures the one or more processors 510 to connect the power supply 545 to the power contacts. For example, the one or more processors 510 may transmit a control signal to a relay that connects a positive terminal of the power supply 545 to the corresponding power contact. In some embodiments, a second signal may be an enable signal received by the one or more computer processors of the AGV that configures the AGV to connect a power storage device (e.g., a battery) to the corresponding electrical contacts. For example, the second signal may be transmitted to a relay of the AGV that connects a battery terminal to the electrical contact.

In some embodiments, the one or more processors 510 may perform further operations to determine whether to begin power delivery to the AGV. For example, the one or more processors 510 may measure a voltage across the power contacts to determine whether a battery of the AGV is coupled with the power contacts, whether the battery in is a condition suitable for charging, and so forth. The measurement may be acquired responsive to a signal received from the AGV, after an elapse of time after transmitting the second signal, and so forth.

In some embodiments, the signal indicates that the charging device 225 is assigned to deliver power to the AGV. This may be particularly relevant for the rail-based system 200 of FIG. 2, where a plurality of charging devices 225-1, 225-2 are serially arranged along the rails 220-1, 220-2. The assignment of the charging devices 225-1, 225-2 may help ensure that the charging devices 225-1, 225-2 are effectively employed. In one example, only one-way traffic is permitted along the rails 220-1, 220-2, so the charging devices 225-1, 225-2 may be assigned so that charging a first AGV does not prohibit (e.g., physically block) a second AGV from coupling with another unoccupied charging device.

In some embodiments, the memory 515 stores an identification 520 that uniquely identifies the charging device 225, and the identification 520 may be included in a signal transmitted to the AGV through the control contact. In some embodiments, the one or more computer processors of the AGV determines whether the identification 520 matches the assignment. If the identification 520 matches the assignment, the AGV remains coupled to the charging device 225 to charge. In some cases, the one or more computer processors of the AGV communicate a confirmation to the charging device 225 that confirms the assignment of the charging device 225 to deliver power to the AGV. If the identification 520 does not match the assignment, the AGV decouples from the charging device 225 and proceeds (e.g., along the rails 220-1, 220-2) to another charging device 225.

In some alternate implementations, some or all of the functionality of the one or more processors 510 may be implemented in hardware external to the base 505, e.g., included in a controller of the externally-implemented power supply 545.

Figure 6A:
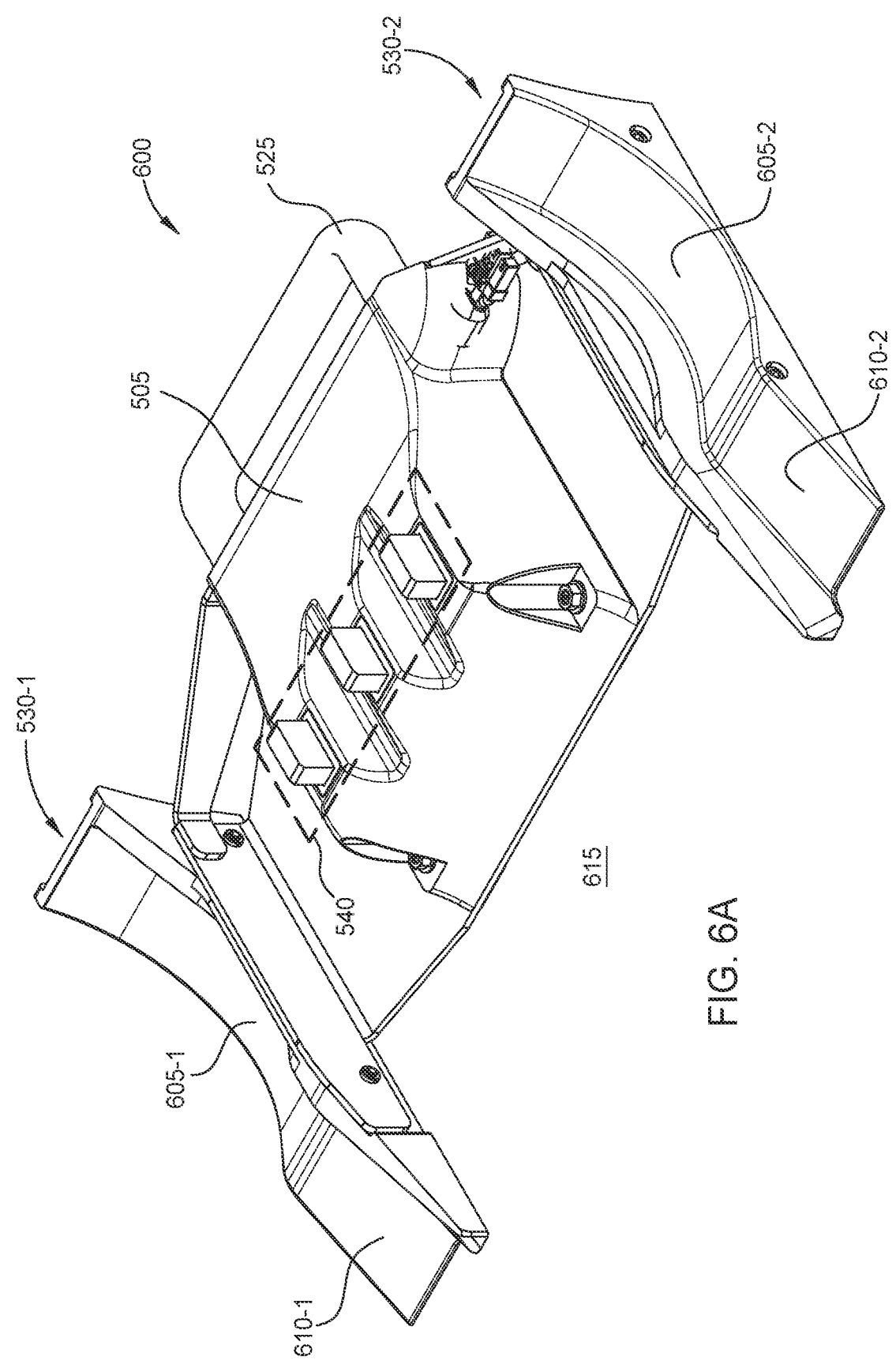
FIG. 6A is a perspective view of a charging device with receiver sections having ramps and arcuate detents, according to one or more embodiments.
Figure 6B:
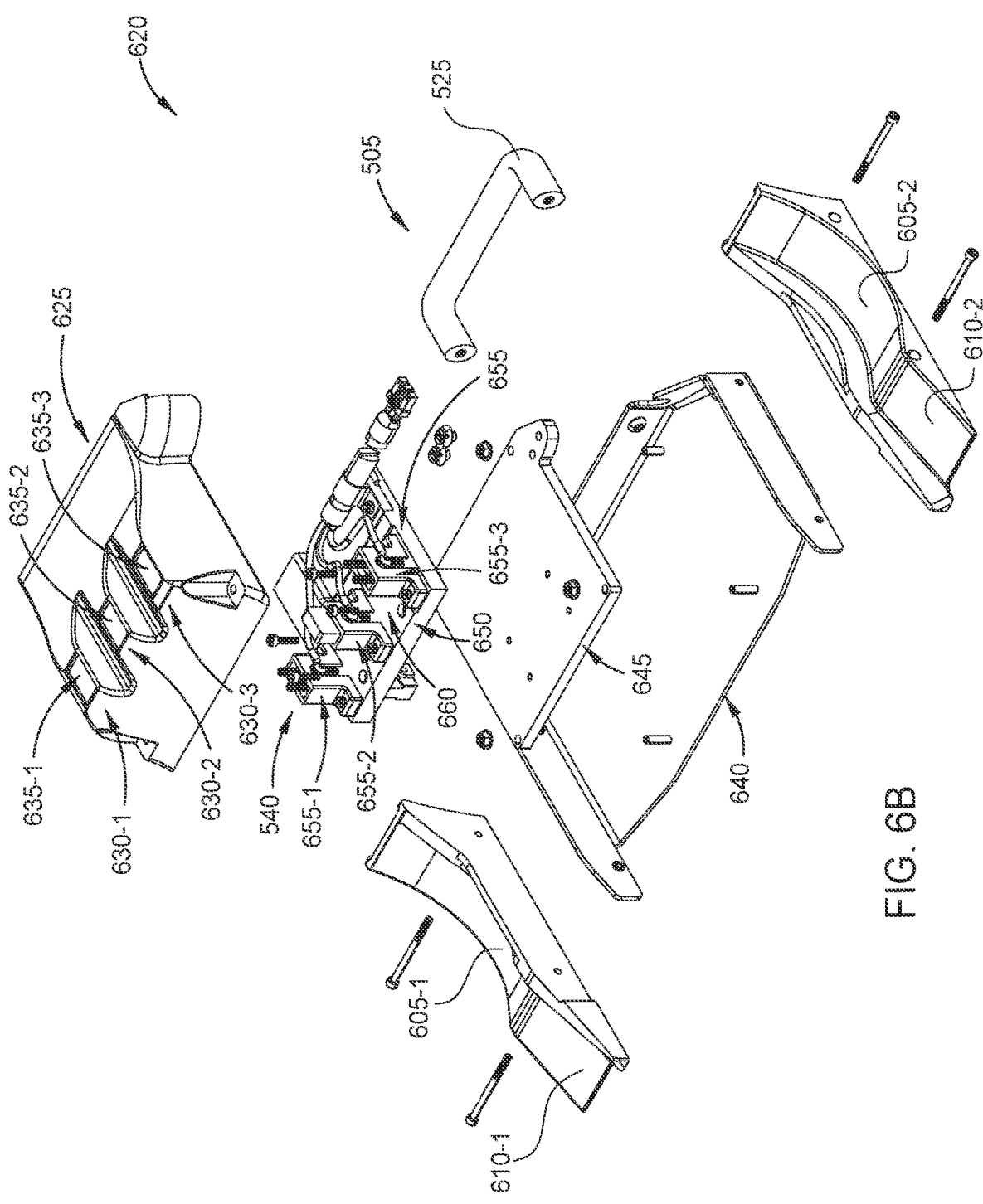
FIG. 6B is an exploded view of a charging device with receiver sections having ramps and arcuate detents, according to one or more embodiments.

FIG. 6A is a perspective view 600, and FIG. 6B is an exploded view 620, of a charging device with receiver sections 530-1, 530-2 having ramps 610-1, 610-2 and arcuate detents 605-1, 605-2, according to one or more embodiments. The features illustrated in the views 600, 620 may be used in conjunction with other embodiments. For example, the charging device may be used in the rail-based system 200 of FIG. 2.

In the views 600, 620, the plurality of receiver sections 530-1, 530-2 comprise a plurality of arcuate detents 605-1, 605-2 that are dimensioned to receive and retain wheels of the AGV. In some embodiments, the arcuate detents 605-1, 605-2 have a radius of curvature that is greater than or equal to a radius of the wheels of the AGV. In some embodiments, the receiver sections 530-1, 530-2 may limit lateral movement of the wheels when received in the arcuate detents 605-1, 605-2.

In some embodiments, the plurality of receiver sections 530-1, 530-2 further comprise a plurality of ramps 610-1, 610-2 having inclined ends arranged adjacent to the plurality of arcuate detents 605-1, 605-2. In these embodiments, the axially-aligned wheels are received into the plurality of arcuate detents 605-1, 605-2 after rolling past the inclined ends of the plurality of ramps 610-1, 610-2.

In some embodiments, after completion of the charging of the AGV, the AGV may drive the axially-aligned wheels to exit the receiver section 530-1, 530-2. For example, the AGV may drive the axially-aligned wheels in a direction opposite the direction of entering the arcuate detents 605-1, 605-2, which causes the wheels to over the inclined ends of the ramps 610-1, 610-2 and down the ramps 610-1, 610-2. In alternate implementations, the receiver sections 530-1, 530-2 may include additional ramps having inclined ends arranged adjacent to ends of the detents 605-1, 605-2 opposite the ramps 610-1, 610-2. For example, the AGV may drive the axially-aligned wheels in a same direction of entering the arcuate detents 605-1, 605-2, which causes the wheels to over the inclined ends of the additional ramps and down the additional ramps.

The base 505 is disposed on a reference surface 615, such as a floor of a residential, commercial, or industrial environment. The base 505 comprises a housing 625 that attaches to a baseplate 640 (e.g., using threaded fasteners). The housing 625 and the baseplate 640 may be formed of any suitable material(s); for example, the housing 625 may be formed of a thermoplastic polymer and the baseplate 640 may be formed of metal (e.g., aluminum or steel).

The receiver sections 530-1, 530-2 attach to lateral portions of the baseplate 640. The electrical contacts 540 project upwardly from ridges 630-1, 630-2, 630-3 of the housing 625. Each of the ridges 630-1, 630-2, 630-3 defines a respective opening 635-1, 635-2, 635-3 through which a respective electrical contact 540 extends. The ridges 630-1, 630-2, 630-3 are separated by grooves.

A spacer 645 is arranged above the baseplate 640, and a substrate 650 is arranged above the spacer 645. The substrate 650 may be attached to the spacer 645 using threaded fasteners. The baseplate 640 may be attached to both the spacer 645 and the housing 625 using the same threaded fasteners.

The electrical contacts 540 may be attached to the substrate 650 using threaded fasteners. In some embodiments, the electrical contacts 540 are elastically-biased electrical contacts 655-1, 655-2, 655-3. Beneficially, the elastically-biased electrical contacts 655-1, 655-2, 655-3 may deflect and/or displace to accommodate wear of components, misalignments between the AGV and the charging device, and so forth.

In some embodiments, different ones of the elastically-biased electrical contacts 655-1, 655-2, 655-3 project to different heights. As shown, the elastically-biased electrical contacts 655-1, 655-2 are power contacts that project to a first height, and the elastically-biased electrical contact 655-3 is a control contact that projects to a second height that is less than the first height. In some embodiments, contacting the electrical contacts of the AGV to the electrical contacts 540 causes the elastically-biased electrical contacts 655-1, 655-2 to be depressed to the second height, and may thereafter cause the elastically-biased electrical contacts 655-1, 655-2, 655-3 to be depressed to a third height less than the second height.

In some embodiments, the elastically-biased electrical contacts 655-1, 655-2, 655-3 have a same sizing. To achieve the sequenced contacting described above, the elastically-biased electrical contacts 655-1, 655-2 may be attached to a top surface 660 of the substrate 650 and the elastically-biased electrical contact 655-3 may be attached to a recessed surface 665 of the substrate 650. In alternate embodiments, the elastically-biased electrical contact 655-3 may have a lesser height than the elastically-biased electrical contacts 655-1, 655-2 and attached to a same surface as the elastically-biased electrical contacts 655-1, 655-2 (e.g., the top surface 660). In some embodiments, the power contacts may be dimensioned to be larger than the control contact, as the power contacts may support significantly greater electrical current flow than the control contact.

Using the sequenced contacting, the electrical contacts 540 of the charging device and/or the electrical contacts of the AGV are externally facing, and may remain galvanically isolated from the respective power sources (e.g., the power supply 545 and the battery of the AGV) until the AGV is coupled (or docked) with the charging device. As discussed above, contacting the power contacts first according to the sequenced contacting may reduce the possibility of arcing and oxidation of the power contacts. Further, the galvanic isolation may increase the safety of the charging device and discourage tampering.

Figure 6C:
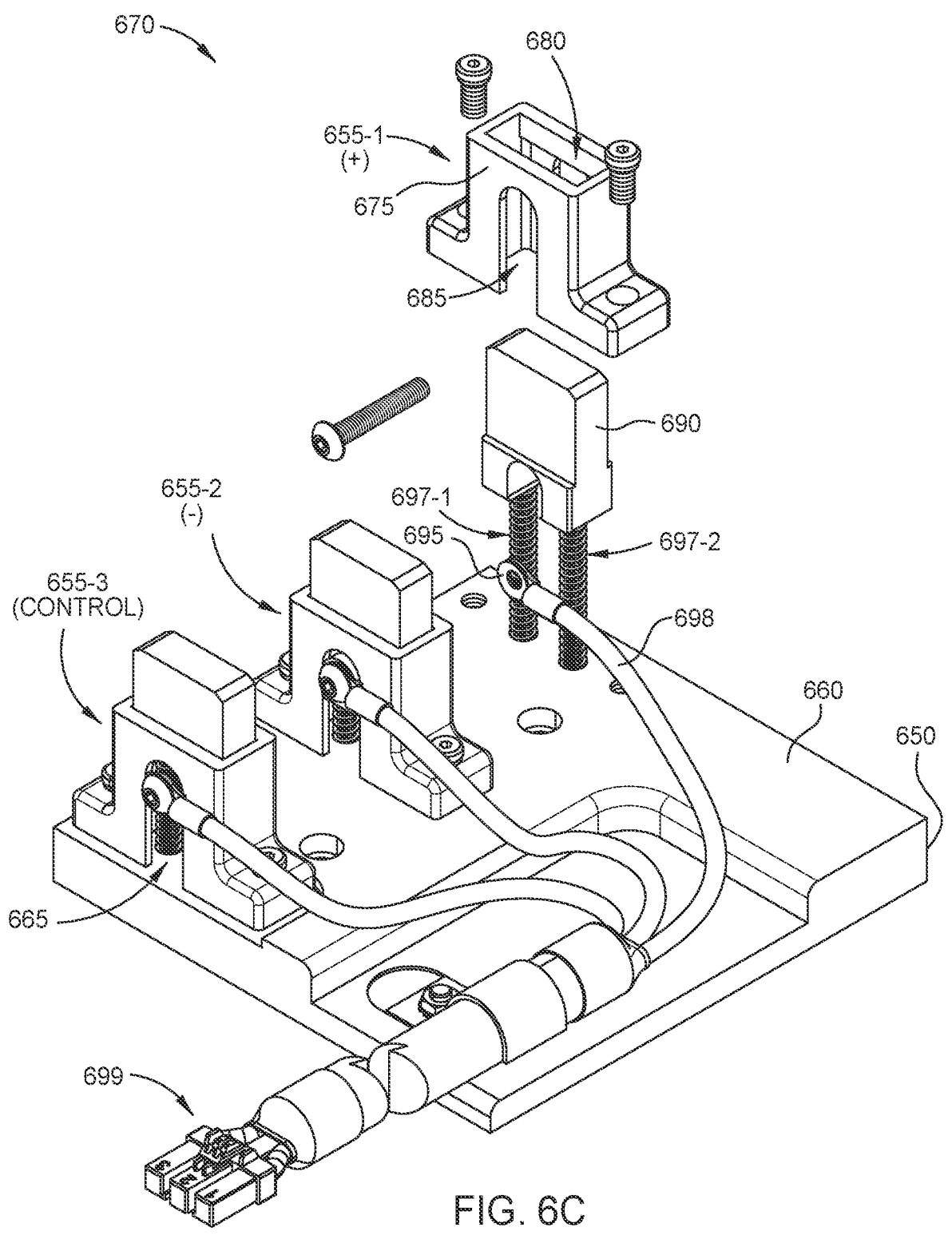
FIG. 6C is a partially exploded view of spring-loaded electrical contacts of a charging device, according to one or more embodiments.

FIG. 6C is a partially-exploded view 670 of spring-loaded electrical contacts of a charging device, according to one or more embodiments. More specifically, the partially-exploded view 670 provides an exploded view of the elastically-biased electrical contact 655-1. In some embodiments, the elastically-biased electrical contacts 655-2, 655-3 are similarly configured to the elastically-biased electrical contact 655-1.

The elastically-biased electrical contact 655-1 comprises a housing 675 and a conductive tab 690, which may be formed of any suitable material(s). For example, the housing

675 may be formed of a thermoplastic polymer or other insulative material, and the conductive tab 690 may be formed of a conductive metal such as copper. In some embodiments, the conductive tab 690 extends vertically through a top opening 680 of the housing 675. The conductive tab 690 contacts the top surface 660 through springs 697-1, 697-2 that provide the elastic biasing to the conductive tab 690. As shown, the elastically-biased electrical contact 655-2 contacts the top surface 660 through corresponding springs, and the elastically-biased electrical contact 655-3 contacts the recessed surface 665 through corresponding springs.

The conductive tab 690 and the housing 675 are dimensioned such that the vertical travel of the conductive tab 690 is limited by the housing 675. Thus, the conductive tab 690 may slide within the housing 675 responsive to pressing (or releasing) a top surface of the conductive tab 690.

The housing 675 defines a side slot 685, through which a terminal 695 of a wire 698 attaches to the conductive tab 690. The side slot 685 is arranged and dimensioned such that the connection with the terminal 695 is able to slide up and down with the conductive tab 690. The wire 698, along with wires connected to the conductive tabs of the elastically-biased electrical contacts 655-2, 655-3, connects to a connector 699. Thus, the connector 699 may provide both power and control connections. As shown, the elastically-biased electrical contact 655-1 is a first power contact to be connected through the connector 699 to a positive (+) terminal of the power supply, the elastically-biased electrical contact 655-2 is a second power contact to be connected through the connector 699 to a negative (–) terminal of the power supply, and the elastically-biased electrical contact 655-3 is a control contact to be connected through the connector 699 to processor(s) of the power supply or of the charging device.

Beneficially, the implementation of the elastically-biased electrical contacts 655-1, 655-2, 655-3 provides a relatively large range of vertical travel that accommodates wear of the wheels of the AGV, which causes the AGV to sit at a lower vertical height when mating with the charging device. The large range of vertical travel may further accommodate flexure of the structure of the AGV, such as during operation of the AGV at higher temperatures. In some embodiments, the range of vertical travel is about 5-25 millimeters (mm).

Figure 7:
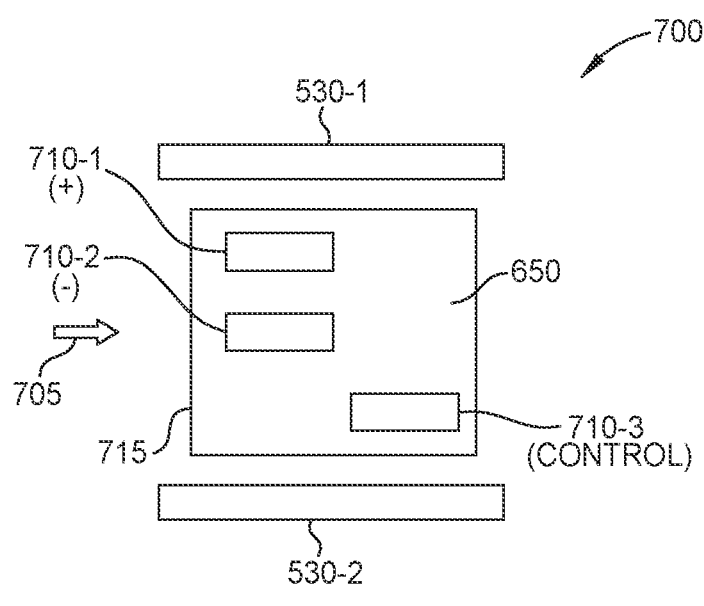
FIG. 7 is a diagram of an arrangement of offset electrical contacts, according to one or more embodiments.

FIG. 7 is a diagram 700 of an arrangement of offset electrical contacts, according to one or more embodiments. The features illustrated in the diagram 700 may be used in conjunction with other embodiments, e.g., an alternate arrangement of the electrical contacts 540 of FIG. 5 that supports sequenced contacting.

In the diagram 700, the substrate 650 is arranged between the receiver sections 530-1, 530-2. A first power contact 710-1 is coupled with a positive (+) terminal, a second power contact 710-2 is coupled with a negative (–) terminal, and a control contact 710-3 is coupled to processor(s) of the power supply or of the charging device. In the diagram 700, the control contact 710-3 is offset from the power contacts 710-1, 710-2 in a direction of rolling 705 of the AGV. As shown, the power contacts 710-1, 710-2 are arranged at a first distance from a forward edge 715 of the substrate 650, and the control contact 710-3 is arranged at a second, greater distance from the forward edge 715 of the substrate 650.

Although the power contacts 710-1, 710-2 and the control contact 710-3 are shown as being approximately a same size, in other implementations, the power contacts 710-1, 710-2 may be dimensioned to be larger than the control contact 710-3 to support greater electrical currents. Further, the power contacts 710-1, 710-2 and/or the control contact 710-3 may be elastically-biased electrical contacts and/or fixed electrical contacts.

Figure 8A:
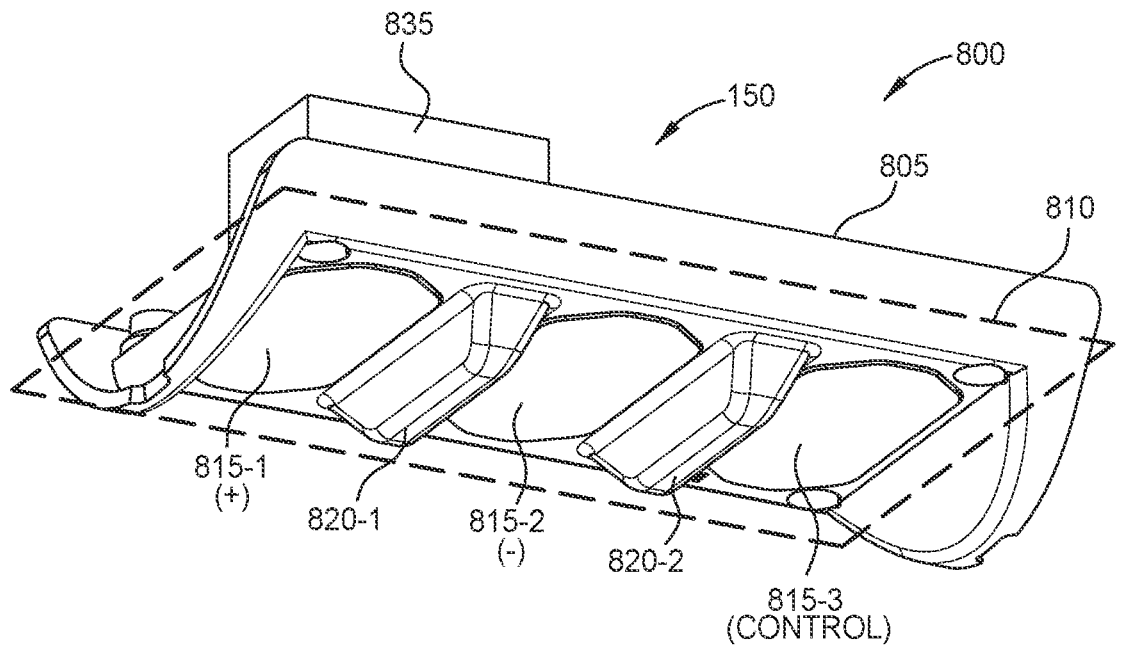
FIG. 8A is a perspective view of a charging interface of an autonomous ground vehicle, according to one or more embodiments.
Figure 8B:
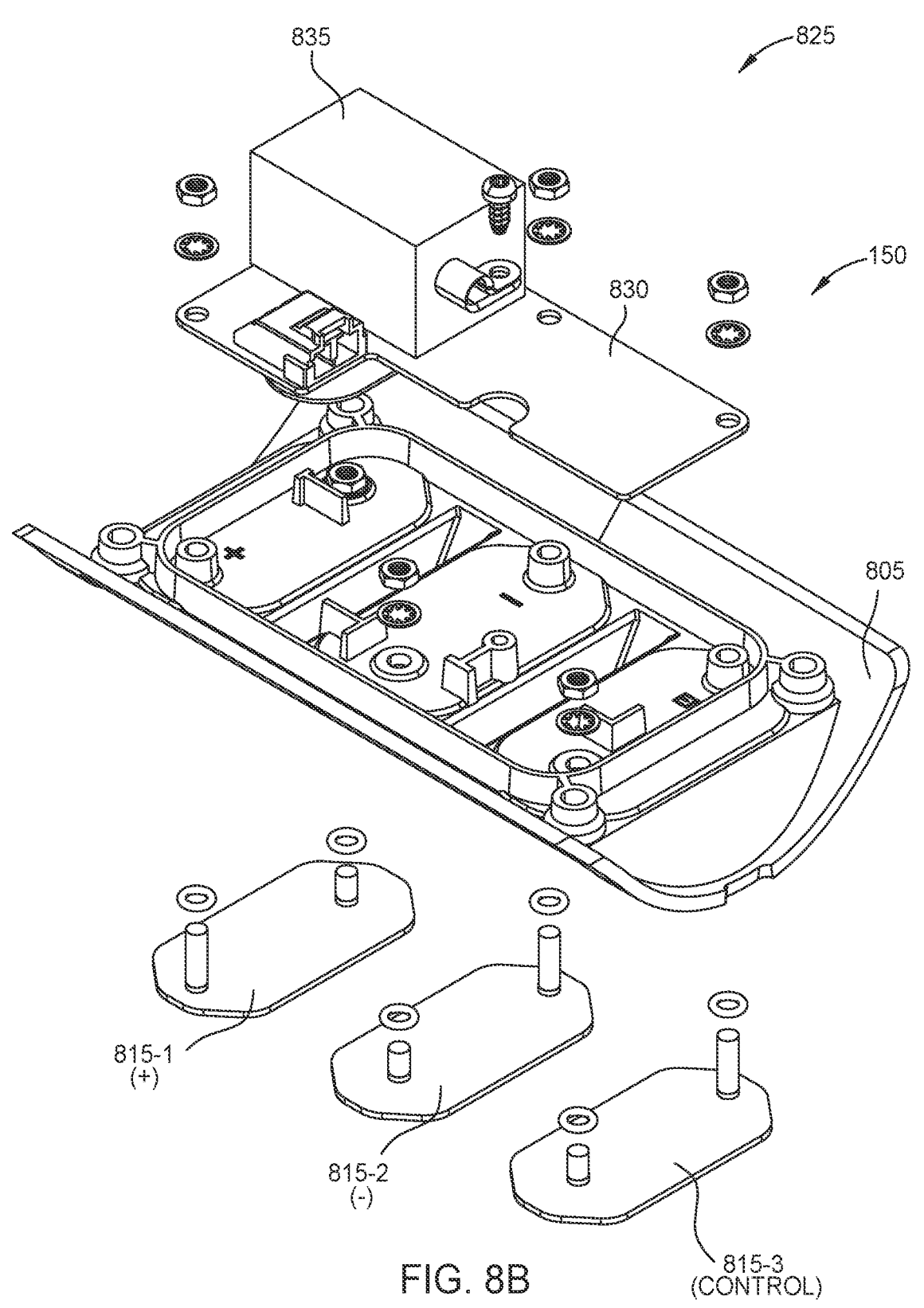
FIG. 8B is an exploded view of a charging interface of an autonomous ground vehicle, according to one or more embodiments.

FIG. 8A is a perspective view 800, and FIG. 8B is an exploded view 825, of a charging interface 150 of an autonomous ground vehicle, according to one or more embodiments. The features illustrated in the views 800, 825 may be used in conjunction with other embodiments. For example, the charging interface 150 may be used to connect the AGV to the elastically-biased electrical contacts 655-1, 655-2, 655-3 of FIGS. 6A-6C.

The charging interface 150 comprises a housing component 805 formed of any suitable insulative material(s) (e.g., a thermoplastic polymer), and a plurality of electrical contacts 810. The plurality of electrical contacts 810 comprises a first power contact 815-1 coupled with a positive (+) terminal, a second power contact 815-2 coupled with a negative (−) terminal, and a control contact 815-3 coupled to processor(s) of the AGV. In some embodiments, the power contacts 815-1, 815-2 and the control contact 815-3 define planar sections arranged within a same plane, but other configurations are also contemplated.

In some embodiments, the housing component 805 forms a portion of the housing of the AGV when attached. In some embodiments, the housing component 805 defines a plurality of ridges 820-1, 820-2 that spatially separate the power contacts 815-1, 815-2 and the control contact 815-3. In some embodiments, the ridges 820-1, 820-2 are received in grooves of the charging device to align the power contacts 815-1, 815-2 and the control contact 815-3 with corresponding electrical contacts of the charging device.

The charging interface 150 further comprises a relay 835 electrically connected to a circuit board 830. The circuit board 830 may be attached to the housing component 805 using threaded fasteners. In some embodiments, the control contact 815-3 provides a control signal to the relay 835 to selectively couple a positive terminal of a battery of the AGV with the first power contact 815-1. Although not discussed here, the circuit board 830 may include other electrical components.

In some embodiments, each of the power contacts 815-1, 815-2 and the control contact 815-3 include multiple studs extending from the planar sections. The studs may be attached to the planar sections using any suitable techniques, such as welding. In alternate implementations, the studs may be integrally formed with the planar sections. In some embodiments, the studs extend substantially perpendicular to the planar sections. The studs extend through the housing component 805 and are secured to an opposing side of the housing component 805 from the planar sections. For example, the studs may be threaded studs and secured to the housing component 805 using hex nuts. In some embodiments, gaskets may be arranged between the studs and the housing component 805 to improve the waterproofing characteristics of the charging interface.

In some embodiments, the studs of each of the power contacts 815-1, 815-2 and the control contact 815-3 have different lengths so that the power contacts 815-1, 815-2 and the control contact 815-3 can be installed to the housing component 805 only with a specified orientation.

FIG. 9A is a side view 900, and FIG. 9B is a rear view 910, of an autonomous ground vehicle having axially-aligned wheels rolling toward arcuate detents of the charging device, according to one or more embodiments. The features illustrated in the views 900, 910 may be used in conjunction with other embodiments.

In the view 900, the wheel 135-6 (a rear wheel of the AGV) rolls up the ramp 610-2 to an inclined end of the ramp 610-2, prior to rolling into the arcuate detent 605-2. Although not shown in the view 900, the wheel 135-3 that is axially aligned with the wheel 135-6 rolls up the ramp 610-1 to an inclined end of the ramp 610-1, prior to rolling into the arcuate detent 605-1.

In the view 910, the power contact 655-1, 655-2 extend to a first height h1, and the control contact 655-3 extends to a second height h2 that is less than the first height h1. In some embodiments, a difference between the first height h1 and the second height h2 is between about 2-10 mm. For example, the power contacts 655-1, 655-2 may have a vertical travel of about 15 mm and the difference between the first height h1 and the second height h2 is about 2.5 mm.

The power contact 655-1 projects upwardly from the ridge 630-1, the power contact 655-2 projects upwardly from the ridge 630-2, and the control contact 655-3 projects upwardly from the ridge 630-3. The power contact 815-1 of the AGV is disposed above, and spaced apart from, the power contact 655-1, the power contact 815-2 of the AGV is disposed above, and spaced apart from, the power contact 655-2, and the control contact 815-3 of the AGV is disposed above, and spaced apart from, the control contact 655-3. The ridges 630-1, 630-2 are separated by a first groove 915-1, and the ridges 630-2, 630-3 are separated by a second groove 915-2. The grooves 915-1, 915-2 are configured to receive the ridges 820-1, 820-2 as the wheel 135-6 rolls into the arcuate detent 605-2.

FIG. 9C is a cross-sectional view 920 of the autonomous ground vehicle illustrating electrical contacts of the charging interface and the charging device. In some embodiments, the electrical contacts of the charging device are arranged relative to the plurality of actuate detents such that leading edges of the electrical contacts of the AGV pass trailing edges of the electrical contacts of the charging device prior to contacting the electrical contacts of the charging device. As shown, the leading edge 925 of the power contact 815-1 will pass the trailing edge 930 of the power contact 655-1 before the power contact 815-1 is lowered onto the power contact 655-1.

With this arrangement, only metal-to-metal contact occurs between the electrical contacts of the charging device and the electrical contacts of the AGV. Beneficially, the consistent metal-to-metal contact tends to prevent debris from accumulating between the electrical contacts. The consistent metal-to-metal contact also tends to prevent marring of other external surfaces of the charging device and/or the AGV.

Figures 10A, 10B:
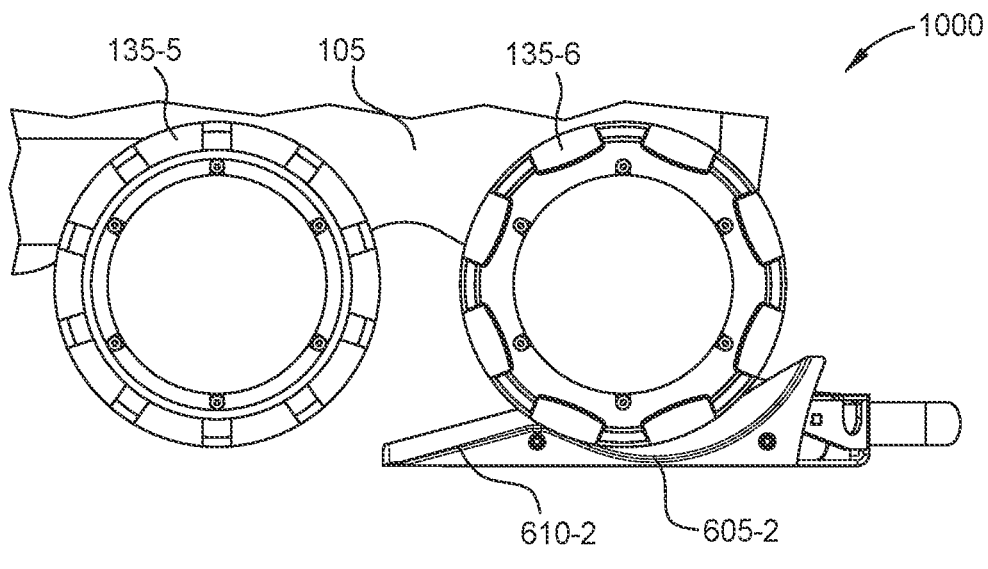
FIG. 10A is a side view of an autonomous ground vehicle having axially-aligned wheels rolling into arcuate detents, according to one or more embodiments.
FIG. 10B is a rear view of the autonomous ground vehicle illustrating electrical contacts of the charging interface and the charging device, according to one or more embodiments.

FIG. 10A is a side view 1000, and FIG. 10B is a rear view 1010, of an autonomous ground vehicle having the axially-aligned wheels 135-3, 135-6 rolling into the arcuate detents 605-1, 605-2, according to one or more embodiments. The features illustrated in the views 1000, 1010 may be used in conjunction with other embodiments.

In the view 1000, the wheel 135-6 has begun rolling into the arcuate detent 605-2. In the view 1010, the AGV is lowered such that the power contacts 815-1, 815-2, 815-3 are lowered to the first height h1 of the power contacts 655-1, 655-2. Thus, the power contact 815-1 contacts the power contact 655-1, and the power contact 815-2 contacts the power contact 655-2. Due to the difference in the heights h1, h2, the control contact 815-3 of the AGV remains disposed above, and spaced apart from, the control contact 655-3.

As discussed above, by first contacting the power contacts 815-1, 815-2 of the AGV to the power contacts 655-1, 655-2 of the charging device, the galvanic connection may be established between the power contacts 655-1, 815-1 and/or the power contacts 655-2, 815-2 before applying voltage across the power contacts. In this way, arcing with the power contacts may be avoided when the AGV mates with the charging device.

Figure 11A:
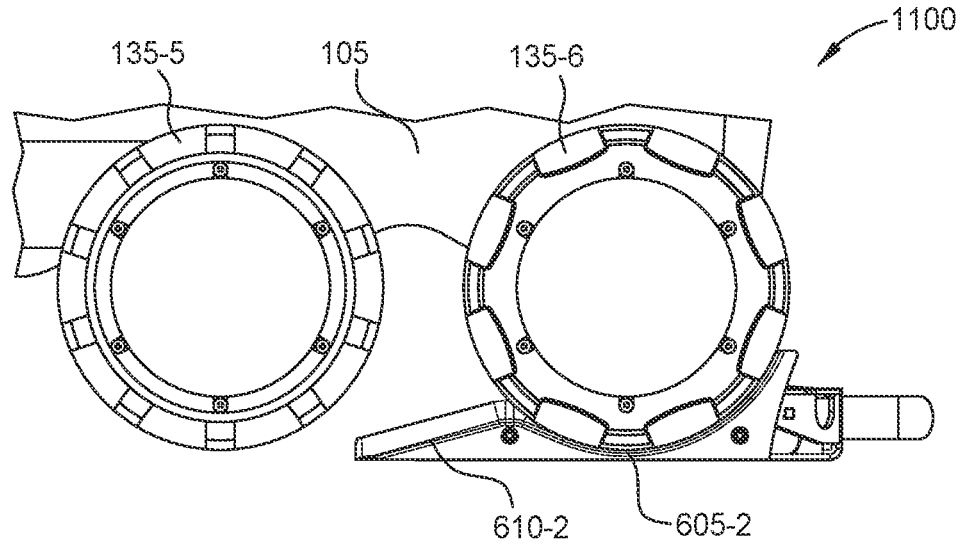
FIG. 11A is a side view of an autonomous ground vehicle having axially-aligned wheels retained in arcuate detents, according to one or more embodiments.
Figure 11B:
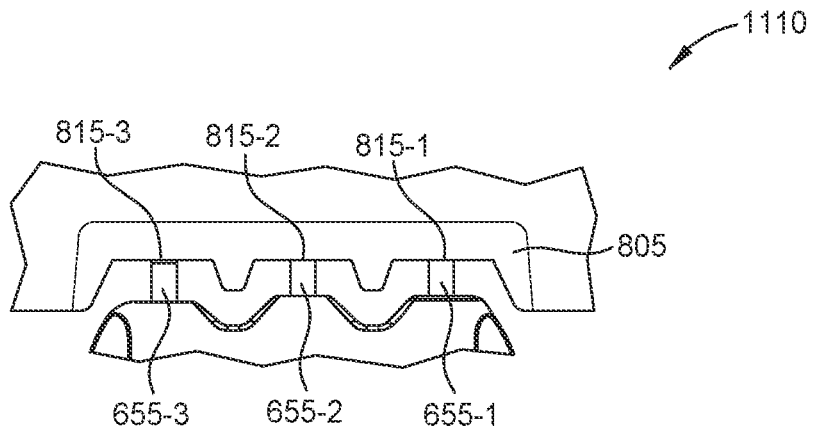
FIG. 11B is a rear view of the autonomous ground vehicle illustrating electrical contacts of the charging interface and the charging device, according to one or more embodiments.

FIG. 11A is a side view 1100, and FIG. 11B is a rear view 1110, of an autonomous ground vehicle having axially-aligned wheels retained in arcuate detents, according to one or more embodiments. The features illustrated in the views 1100, 1110 may be used in conjunction with other embodiments.

In the view 1100, the wheel 135-6 has rolled into the arcuate detent 605-2 and is retained thereby. In the view 1110, the AGV is lowered such that the power contacts 815-1, 815-2, 815-3 are lowered to at least the second height h2 of the control contact 655-3. Thus, the power contact 815-1 contacts the power contact 655-1, the power contact 815-2 contacts the power contact 655-2, and the control contact 815-3 contacts the control contact 655-3. To accomplish this, the AGV depresses the power contacts 815-1, 815-2. In some embodiments, when the wheel 135-6 is retained by the arcuate detent 605-2, the AGV is lowered to depress the power contacts 815-1, 815-2 and the control contact 815-3 to a third height that is less than the second height.

FIG. 12 is a method 1200 of charging an autonomous ground vehicle, according to one or more embodiments. The method 1200 may be used in conjunction with other embodiments. For example, the method 1200 may describe an operation of mating an AGV with the charging device 225 of FIG. 5.

The method 1200 begins at block 1205, where axially-aligned wheels of the AGV are received into a plurality of receiver sections of a charging device base. In some embodiments, the receiver sections include arcuate detents into which the wheels are received. In other embodiments, the receiver sections include laterally-extending posts spaced apart from each other in a direction of rolling of the AGV.

At block 1215, first electrical contacts of the AGV are contacted with corresponding second electrical contacts that project upwardly from the charging device base. In some embodiments, contacting the first electrical contacts comprises (at block 1220) depressing one or more of the second electrical contacts and/or (at block 1225) depressing an upper portion of the charging device base, which is discussed in greater detail below with respect to FIGS. 13A, 13B, 14, and 15.

In some embodiments, contacting the first electrical contacts comprises (at block 1230) contacting a plurality of the first electrical contracts with power contacts of the second electrical contacts, (at block 1235) contacting a second plurality of the first electrical contacts with data contacts of the second electrical contacts, and (at block 1240) while the plurality of the first electrical contacts are contacted with the power contacts, contacting at least one other of the first electrical contacts with a control contact of the second electrical contacts.

At block 1245, responsive to a signal transmitted through the control contact, the power contacts are energized to deliver power to the AGV. In some embodiments, one or more processor(s) of the charging device transmits a control signal to a relay of the AGV that configures the AGV to connect a battery to the first electrical contacts. Energizing the power contacts may include other operations, such as measuring a voltage across the first electrical contacts to determine whether the battery is coupled, whether the battery is in a suitable condition for charging, and so forth.

In one exemplary embodiment, the charging device transmits a control signal through the control contact to the AGV, and the control signal operates a relay of the AGV to contact one or more battery terminals to the plurality of the second electrical contacts. The charging device measures a voltage between the plurality of the second electrical contacts, and enables the power delivery to the AGV responsive to the measured voltage.

At block 1255, the charging device communicates with the autonomous ground vehicle through the data contacts. The method 1200 ends following completion of block 1255.

Figure 13A:
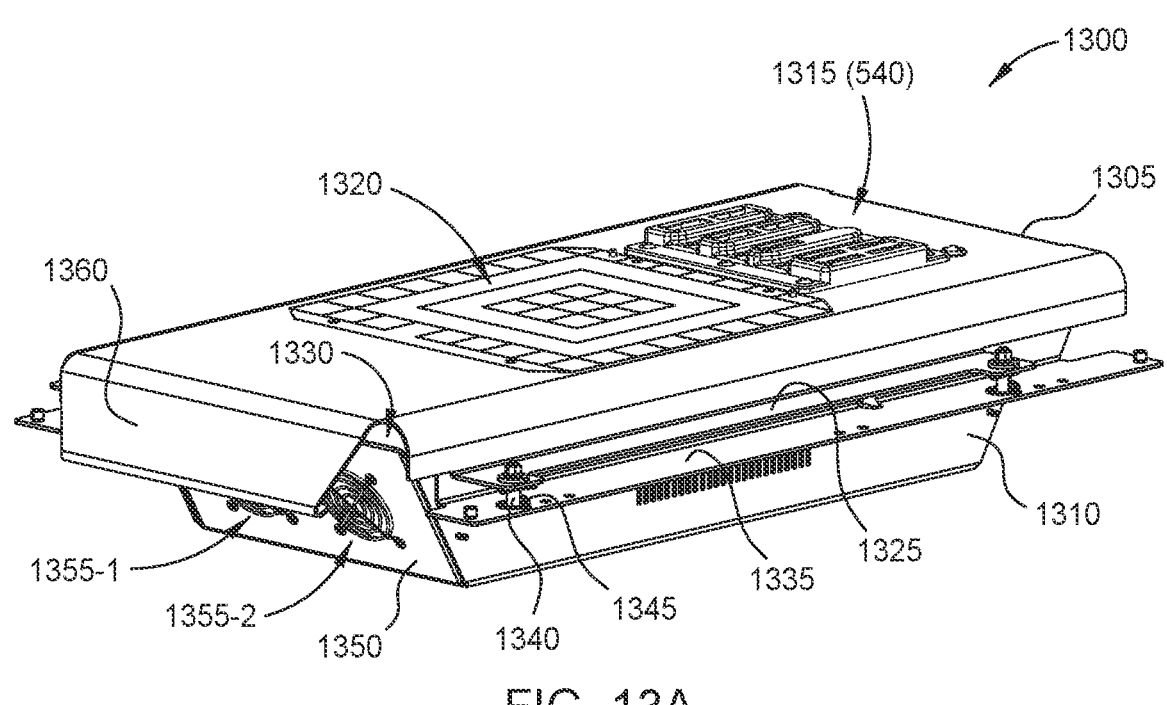
FIG. 13A is a perspective view of a multi-portion charging device, according to one or more embodiments.

FIG. 13A is a perspective view of a multi-portion charging device 1300, according to one or more embodiments. The multi-portion charging device 1300 may be used in conjunction with other embodiments. For example, the charging device 1300 may be used in the rail-based system 200 of FIG. 2.

The charging device 1300 comprises an upper portion 1305 that is a compliantly connected with a lower portion 1310. The upper portion 1305 and the lower portion 1310 may have any suitable geometry and may be formed of any suitable material(s). For example, the upper portion 1305 and the lower portion 1310 may be formed of sheet metal (e.g., aluminum or steel).

As shown, the lower portion 1310 has a frustopyramidal shape in an inverted orientation, such that the smaller base defines a bottom surface of the lower portion 1310 and/or the charging device 1300. The upper portion 1305 includes a top surface arranged above the larger base of the lower portion 1310. The top surface of the upper portion 1305 in some cases may be planar. The upper portion 1305 may further include lateral edges that extend away from the top surface, which in some cases are slanted or curved downward to direct water away from the upper portion 1305. In some embodiments, a charging interface 1315 is attached to the top surface of the upper portion 1305. The charging interface 1315 includes the plurality of electrical contacts 540, as will be discussed in greater detail below.

A lateral edge 1325 of the upper portion 1305 overlaps with a lateral edge 1335 of the lower portion 1310. As shown, the lateral edges 1325, 1335 have a substantially horizontal orientation and are parallel to each other. A plurality of posts 1340 extend between the lateral edges 1325, 1335 and have a substantially vertical orientation. Springs 1345 are arranged around the posts 1340 and between the lateral edges 1325, 1335 and are compressible, providing compliance between the upper portion 1305 and the lower portion 1310.

The charging device 1300 further comprises a compliant gasket 1330 between the upper portion 1305 and the lower portion 1310. The compliant gasket 1330 may be formed of any suitable materials, such as a compressible foam. The compliant gasket 1330 may be implemented as a singular component that extends around a perimeter of the lower portion 1310, a plurality of components that extend around portions of the perimeter, and so forth. The compliant gasket 1330 may improve the waterproofing characteristics of the charging device 1300.

Thus, in some embodiments, the lower portion 1310 may be rigidly arranged (e.g., attached to the rail-based system 200 of FIG. 2, arranged atop a reference surface, and so forth), and the upper portion 1305 may be depressed relative to the lower portion 1310. The compliance between the upper portion 1305 and the lower portion 1310 may be provided by the springs 1345 and/or the compliant gasket 1330.

In some embodiments, the upper portion 1305 and the lower portion 1310 define an interior volume that houses a power supply and/or other components of the multi-portion charging device 1300. A sidewall 1350 of the lower portion 1310 includes openings for one or more fans 1355-1, 1355-2 that circulate air through the interior volume to provide cooling for the power supply. As discussed above, the lower portion 1310 may have a frustopyramidal shape. With the inverted orientation, the sidewall 1350 may be slanted to improve waterproofing characteristics of the charging device 1300.

An identification pattern 1320 is arranged on the top surface of the upper portion 1305. The identification pattern 1320 uniquely identifies the charging device 1300 and may optionally include other information. In some embodiments, sensors of the AGV may scan or image the identification pattern 1320 to determine whether the charging device 1300 is assigned to deliver power to the AGV. For example, the AGV may include a camera or a barcode scanner along a forward surface or underside of the AGV that images the identification pattern.

Figure 13B:
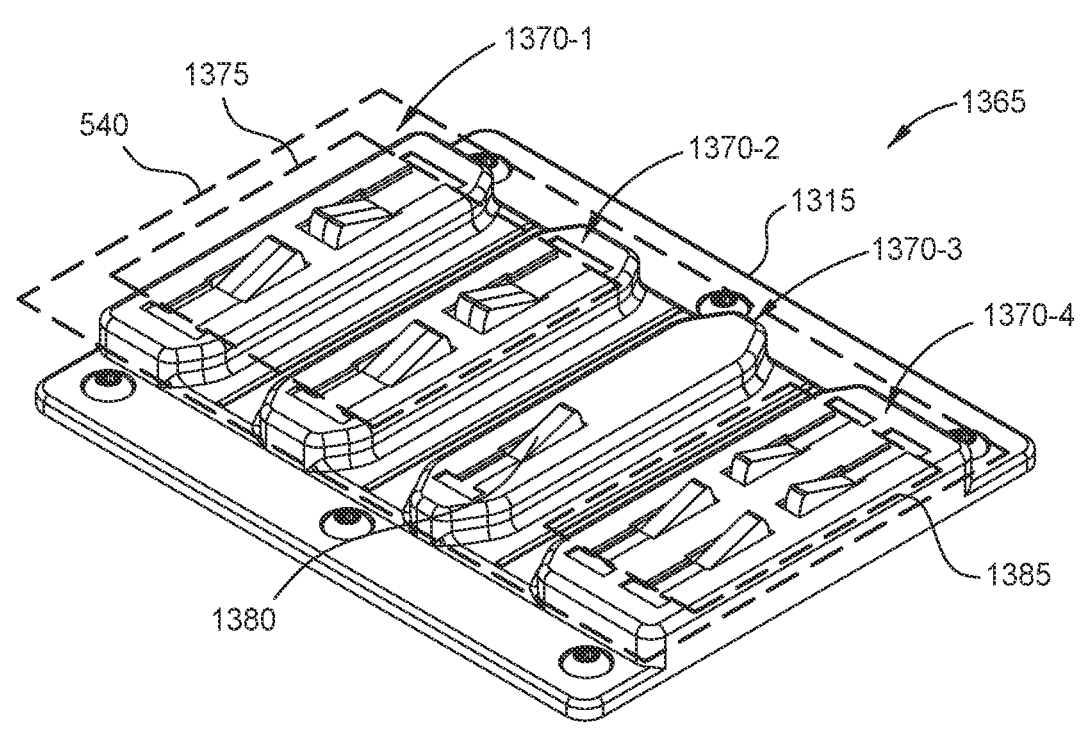
FIG. 13B is a perspective view of a charging interface for a multi-portion charging device, according to one or more embodiments.

FIG. 13B is a perspective view 1365 of the charging interface 1315 for a multi-portion charging device 1300. In some embodiments, the charging interface 1315 attaches to the top surface using threaded fasteners.

The charging interface 1315 defines a plurality of ridges 1370-1, 1370-2, 1370-3, 1370-4 from which the electrical contacts 540 extend. As shown, the electrical contacts 540 comprise power contacts 1375 extending from the ridges 1370-1, 1370-2, a control contact 1380 extending from the ridge 1370-3, and data contacts 1385 extending from the ridge 1370-4.

In some embodiments, each of the power contacts 1375, the control contact 1380, and the data contacts 1385 are elastically-biased electrical contacts that provide compliance when interfacing with the AGV. In one example, the power contacts 1375, the control contact 1380, and the data contacts 1385 may be spring-loaded, such as the power contacts 655-1, 655-2 and the control contact 655-3 of FIG. 6C. In another example, the power contacts 1375, the control contact 1380, and the data contacts 1385 may be formed of spring steel. In some embodiments, the control contact 1380 is offset from the power contacts 1375 and/or the data contacts 1385 to support sequenced contacting.

Figure 14:
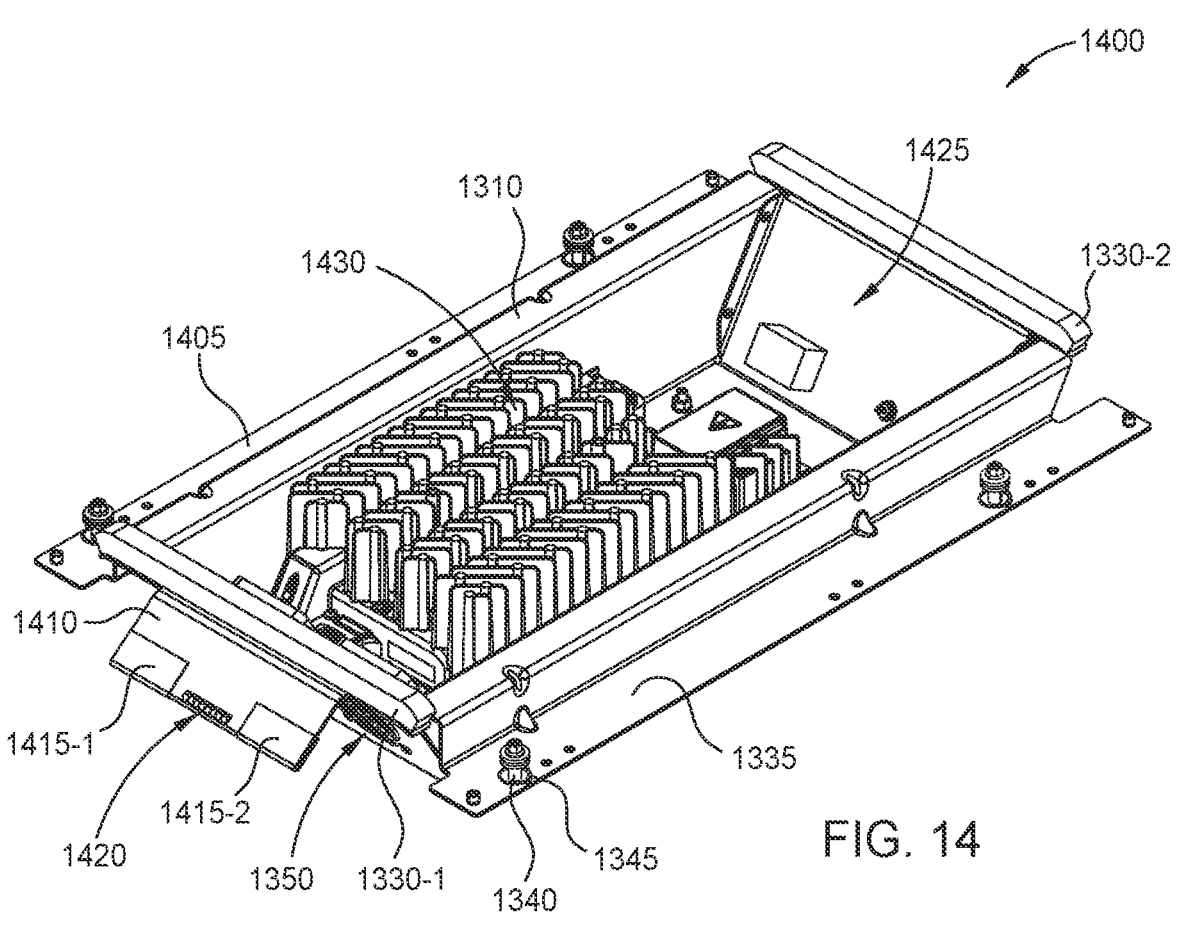
FIG. 14 is a perspective view of a lower portion of a multi-portion charging device, according to one or more embodiments.

FIG. 14 is a perspective view 1400 of the lower portion 1310 of the multi-portion charging device 1300. Two compliant gaskets 1330-1, 1330-2 are arranged above portions of the perimeter of the lower portion 1310, e.g., providing a compliant interface with the upper portion 1305.

The lower portion 1310 further comprises a lateral edge 1405 arranged along an opposite side of the lower portion 1310 as the lateral edge 1335. As with the lateral edge 1335, the lateral edge 1405 may compliantly connect with the upper portion 1305 using posts 1340 and springs 1345. The lower portion 1310 defines an interior volume 1425 in which a power supply 1440 is housed. Although not shown, the power supply 1440 may be connected to at least the power contacts 1375 using cabling in the interior volume 1425.

Figure 15:
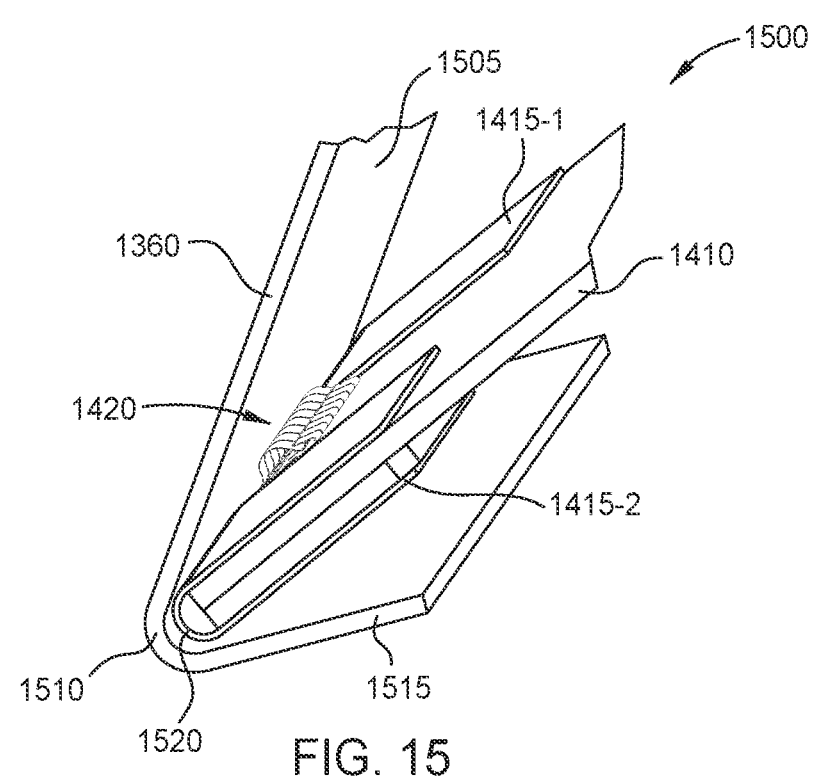
FIG. 15 is a perspective view of an interface between an upper portion and a lower portion of a multi-portion charging device, according to one or more embodiments.

The lower portion 1310 further comprises a lateral edge 1410 that forms a hinge interface with a lateral edge 1360 of the upper portion 1305, which is illustrated in the perspective view 1500 of FIG. 15.

The lateral edge 1410 is folded on itself to define a curved end 1520, and trim pieces 1415-1, 1415-2 are attached to the lateral edge 1410 at the curved end 1520 to provide a low-friction hinge interface between the curved end 1520 and a curved portion 1510 of the lateral edge 1360. The trim pieces 1415-1, 1415-2 may be formed of any suitable, low-friction material, such as plastic. In some embodiments, a straight portion 1505 of the lateral edge 1360 extends to the curve portion 1510 above the lateral edge 1410, and a straight portion 1515 extends from the curved portion 1510 beneath the lateral edge 1410. In this configuration, the hinge interface provides additional compliance between the upper portion 1305 and the lower portion 1310, and may direct water (e.g., dripping down from the AGV) off the upper portion 1305 and away from the interior volume 1425.

In some embodiments, the lateral edge 1410 further comprises conductive fingers 1420 arranged between the plastic trim pieces 1415-1, 1415-2. The conductive fingers 1420 are galvanically connected to the straight portion 1505 of the lateral edge 1360, which prevents a build-up of static charge on the upper portion 1305.

Figure 16:
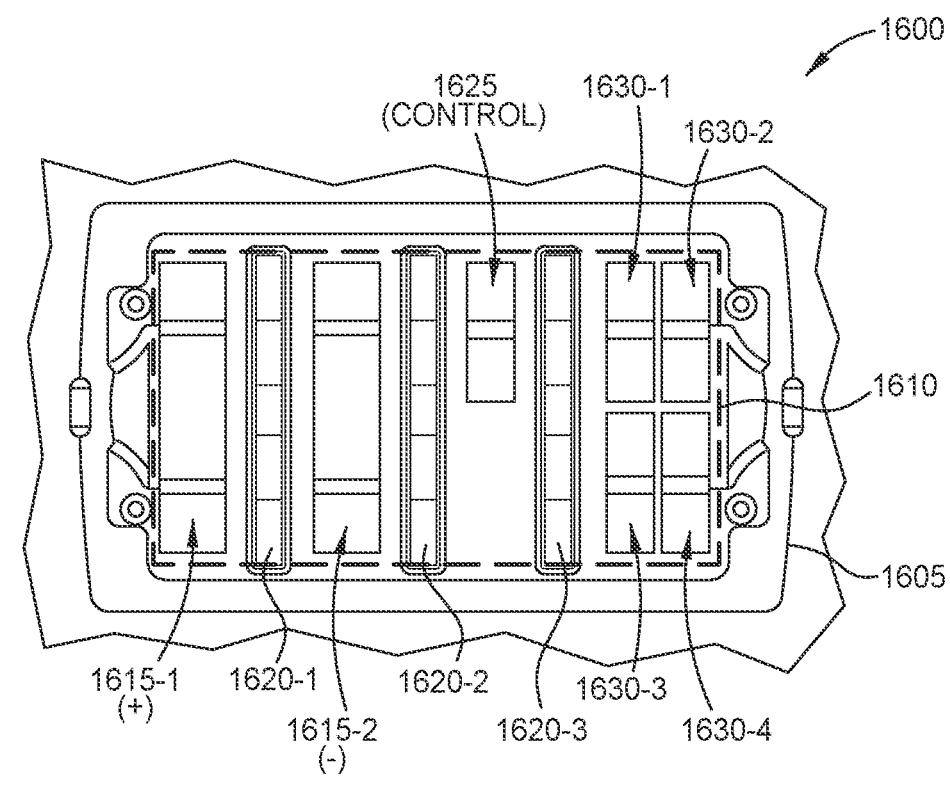
FIG. 16 is a bottom view of a charging interface of an autonomous ground vehicle, according to one or more embodiments.

FIG. 16 is a bottom view of a charging interface 1600 of an autonomous ground vehicle, according to one or more embodiments. The features illustrated in FIG. 16 may be used in conjunction with other embodiments. For example, the charging interface 1600 may couple with the charging interface 1315 of FIG. 13B.

The charging interface 1600 comprises a housing component 1605 that forms a portion of the housing of the AGV. A plurality of electrical contacts 1610 connect to the housing component 1605, the plurality of electrical contacts 1610 may be implemented similar to the power contacts 815-1, 815-2 and the control contact 815-3 (e.g., planar sections connected to studs).

As shown, the electrical contacts 1610 comprises power contacts 1615-1, 1615-2, a control contact 1625, and data contacts 1630-1, 1630-2, 1630-3, 1630-4. The housing component 1605 defines ridges 1620-1, 1620-2, 1620-3, where the ridge 1620-1 separates the power contacts 1615-1, 1615-2, the ridge 1620-2 separates the power contact 1615-2 and the control contact 1625, and the ridge 1620-3 separates the control contact 1625 and the data contacts 1630-1, 1630-2, 1630-3, 1630-4. In some embodiments, the ridges 1620-1, 1620-2, 1620-3 are dimensioned to be received by grooves defined between the different ridges 1370-1, 1370-2, 1370-3, 1370-4 of FIG. 13B.

Figure 17:
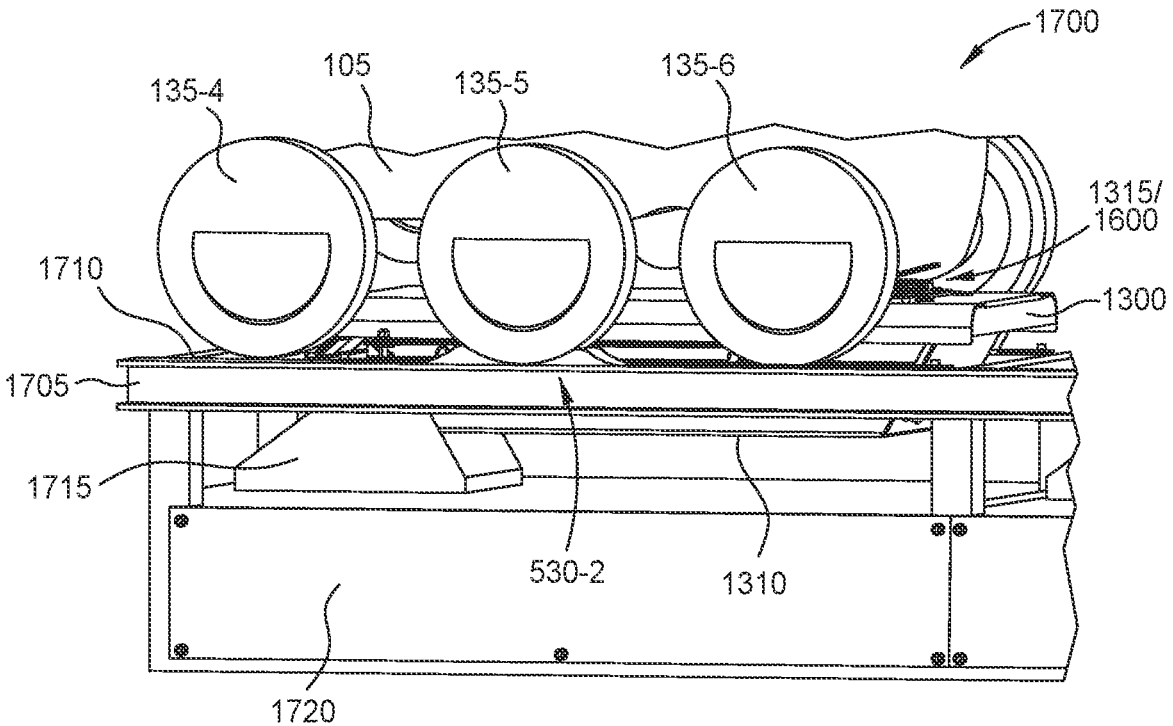
FIG. 17 is a perspective view of a charging device interfaced with ducting, according to one or more embodiments.

FIG. 17 is a perspective view 1700 of the charging device 1300 interfaced with ducting, according to one or more embodiments. The features illustrated in the view 1700 may be used in conjunction with other embodiments.

In the view 1700, the charging device 1300 is mounted to a structure 1705 to which the charging device 1300 is mounted. In some embodiments, the structure 1705 comprises a surface 1710 defining an opening through with the charging device 1300 is partially inserted. As shown, the lower portion 1310 of the charging device 1300 extends beneath the surface 1710 through the opening. In some embodiments, the lower portion 1310 is rigidly attached to the structure 1705.

The charging device 1300 is mated with a ducting interface 1715 in this position. More specifically, the ducting interface 1715 may contact the sidewall 1350 of the lower portion 1310 (as shown in FIG. 13A), such that the interior volume 1425 (as shown in FIG. 14) is in fluid communication with a duct 1720 through the ducting interface 1715. In some embodiments, the duct 1720 is in fluid communication with other charging devices 1300 that are also attached to the rail system.

The duct 1720 and/or the ducting interface 1715 may be attached to the structure 1705 using threaded fasteners. Beneficially, mating the charging device 1300 with the ducting interface 1715 and the duct 1720 may improve the waterproofing characteristics of the charging device 1300.

The receiver section 530-2 is attached to the structure 1705. As shown, the receiver section 530-2 comprises an arcuate detent with ramps on opposing sides. When the wheel 135-5 (a central wheel) is received in the receiver section 530-2, the electrical contacts of the charging interface 1600 are coupled with the electrical contacts of the charging interface 1315 to enable power delivery to the AGV.

FIG. 18 is a method 1800 of operating an autonomous ground vehicle, according to one or more embodiments. The features illustrated in the method 1800 may be used in conjunction with other embodiments, e.g., describing operation of one or more computer processors of the AGV 100 of FIG. 1.

The method 1800 begins at block 1805, where a powertrain of the AGV is operated to roll axially-aligned wheels into receiver sections of a charging device. At block 1815, first electrical contacts of the AGV are sequentially contacted with second electrical contacts of the charging device. In some embodiments, the sequential contact is performed according to method 1200 of FIG. 12.

At block 1825, a control signal is received from a control contact of the second electrical contacts. At block 1835, an identification pattern is detected on a top surface of the charging device. At block 1845, the AGV determines whether the charging device is assigned to deliver power to the AGV. Responsive to determining that the charging device is not assigned to deliver power to the AGV ("No"), the method 1800 proceeds to block 1895 and the powertrain is operated to roll the plurality of axially-aligned wheels out of the plurality of receiver sections.

Responsive to determining that the charging device is assigned to deliver power to the AGV ("Yes"), the method 1800 proceeds to block 1895 and the plurality of first electrical contacts are energized. In some embodiments, energizing the plurality of first electrical contacts comprises (at block 1865) operating a relay to contact battery terminals to a plurality of the first electrical contacts.

At block 1875, the plurality of first electrical contacts are de-energized, e.g., responsive to determining completion of the charging of the AGV. In some embodiments, de-energizing the plurality of first electrical contacts comprises (at block 1885) operating the relay to disconnect the battery terminals from the plurality of the first electrical contacts. The method 1800 proceeds to block 1895, where the powertrain is operated to roll the plurality of axially-aligned wheels out of the plurality of receiver sections. The method 1800 ends following completion of block 1895.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An apparatus for charging an autonomous ground vehicle (AGV), the apparatus comprising:
   a base;
   a power supply;
   a plurality of first electrical contacts coupled to the power supply and that project upwardly from the base, the plurality of first electrical contacts comprising a plurality of power contacts and one or more control contacts, the plurality of power contacts aligned and the one or more control contacts offset from the plurality of power contacts in a direction of engagement of the AGV; and
   a plurality of receiver sections dimensioned to retain portions of the AGV,
   wherein the plurality of first electrical contacts are arranged relative to the plurality of receiver sections such that when the AGV engages the plurality of receiver sections a plurality of second electrical contacts of the AGV sequentially contact the plurality of power contacts and the one or more control contacts, the plurality of power contacts being contacted prior to the one or more control contacts, and wherein at least one of the plurality of second electrical contacts of the AGV contacting the one or more control contacts enables power delivery to the AGV.

2. The apparatus of claim 1, further comprising: one or more computer processors configured to:
   transmit a control signal through the one or more control contacts to the AGV, wherein the control signal operates a relay of the AGV to contact one or more battery terminals to the plurality of second electrical contacts; and
   measure a voltage between the plurality of second electrical contacts; and enable the power delivery to the AGV responsive to the measured voltage.

3. The apparatus of claim 1, wherein the plurality of second electrical contacts are lowered into contact with the plurality of first electrical contacts.

4. The apparatus of claim 1,
   wherein the plurality of power contacts are elastically-biased electrical contacts that project to a first height, and
   wherein the one or more control contacts projects to a second height less than the first height.

5. The apparatus of claim 1,
wherein an upper portion of the base is compliantly connected with a lower portion of the base,
wherein the plurality of first electrical contacts project upwardly from the upper portion, and wherein lowering the plurality of second electrical contacts into contact with the plurality of first electrical contacts causes the upper portion to be depressed.

6. A system for charging multiple autonomous ground vehicles (AGVs), the system comprising:
a plurality of rails spaced apart from each other, the plurality of rails configured to receive portions of an AGV, the plurality of rails being engageable by the AGV from two directions; and
a plurality of charging devices serially arranged between the plurality of rails, the plurality of charging devices configured to simultaneously charge a plurality of AGVs, wherein each charging device comprises:
a base connected to receiver sections disposed on respective ones of the plurality of rails, each receiver section dimensioned to engage the AGV; and
a plurality of first electrical contacts projecting upwardly from the base and arranged between the receiver sections, the plurality of first electrical contacts comprising a plurality of power contacts and one or more control contacts, the plurality of power contacts aligned and the one or more control contacts offset from the plurality of power contacts in a direction of engagement of the AGV,
wherein the plurality of first electrical contacts are arranged relative to the receiver sections such that when the AGV engages the receiver sections, a plurality of second electrical contacts of the AGV sequentially contact the plurality of power contacts and the one or more control contacts, the plurality of power contacts being contacted prior to the one or more control contacts, and wherein at least one of the plurality of second electrical contacts of the AGV contacting the one or more control contacts enables power delivery to the AGV through the plurality of power contacts.

7. The system of claim 6, wherein the plurality of charging devices comprise: one or more computer processors configured to:
transmit a control signal through the one or more control contacts to the AGV, wherein the control signal operates a relay of the AGV to contact one or more battery terminals to the plurality of second electrical contacts; and
measure a voltage between the plurality of second electrical contacts; and
enable the power delivery to the AGV responsive to the measured voltage.

8. The system of claim 6, wherein at least one of the receiver sections comprise a plurality of arcuate detents.

9. The system of claim 6,
wherein the plurality of power contacts are elastically-biased electrical contacts that project to a first height, and
wherein the one or more control contacts projects to a second height less than the first height.

10. The system of claim 6, wherein the plurality of second electrical contacts are lowered into contact with the plurality of first electrical contacts.

11. The system of claim 6, wherein the plurality of second electrical contacts are arranged relative to the receiver sections such that leading edges of the plurality of first electrical contacts pass trailing edges of the plurality of second electrical contacts prior to contacting the plurality of second electrical contacts.

12. An autonomous ground vehicle (AGV) and a charging device system comprising:
the AGV comprising:
a battery;
a powertrain electrically coupled with the battery; and
a charging interface comprising a plurality of first electrical contacts, and the charging device comprising:
a plurality of rails configured to receive portions of the AGV;
a plurality of receiver sections;
a plurality of power contacts aligned and arranged between the plurality of receiver sections; and
a control contact arranged between the plurality of receiver sections, the control contact being offset from the plurality of power contacts in a direction of engagement of the AGV,
wherein the plurality of first electrical contacts are arranged such that, when the AGV engages the plurality of receiver sections of the charging device, the plurality of first electrical contacts sequentially contact the plurality of power contacts and the control contact, the plurality of power contacts being contacted prior to the control contact,
wherein, one of the plurality of first electrical contacts contacting the control contact enables power delivery from the charging device through the plurality of power contacts.

13. The autonomous ground vehicle (AGV) and charging device system of claim 12, further comprising: a relay coupled with the battery,
wherein, responsive to a control signal received through the control contact, the relay is operated to contact one or more terminals of the battery to the plurality of first electrical contacts, and
wherein power delivery from the charging device is enabled responsive to a voltage across the plurality of first electrical contacts.

14. The autonomous ground vehicle (AGV) and charging device system of claim 12, further comprising:
a sensor configured to detect an identification pattern on a top surface of the charging device; and
one or more computer processors configured to:
determine, using the identification pattern, whether the charging device is assigned to deliver power to the autonomous ground vehicle.

15. The autonomous ground vehicle (AGV) and charging device system of claim 14, wherein the one or more computer processors configured to:
responsive to determining that the charging device is not assigned to deliver power to the autonomous ground vehicle, operate the powertrain to disengage the AGV from the plurality of receiver sections.

* * * * *